United States Patent
Knopf et al.

(10) Patent No.: US 8,384,548 B2
(45) Date of Patent: *Feb. 26, 2013

(54) SYSTEM AND METHODS FOR ENSURING PROPER USE OF PERSONAL PROTECTIVE EQUIPMENT FOR WORK SITE HAZARDS

(75) Inventors: Kevin Michael Knopf, Warson Woods, MO (US); Todd Francis Lottmann, Washington, MO (US)

(73) Assignee: Cooper Technologies Company, Houston, TX (US)

( * ) Notice: Subject to any disclaimer, the term of this patent is extended or adjusted under 35 U.S.C. 154(b) by 194 days.

This patent is subject to a terminal disclaimer.

(21) Appl. No.: 12/359,518

(22) Filed: Jan. 26, 2009

(65) Prior Publication Data

US 2010/0045464 A1 Feb. 25, 2010

Related U.S. Application Data

(63) Continuation of application No. 11/890,695, filed on Aug. 7, 2007, now Pat. No. 8,207,858.

(51) Int. Cl.
*G08B 23/00* (2006.01)
(52) U.S. Cl. .......... 340/573.1; 340/5.1; 340/5.7
(58) Field of Classification Search .......... 340/500, 340/540, 573.1, 825, 5.1, 5.2, 5.21
See application file for complete search history.

(56) References Cited

U.S. PATENT DOCUMENTS

| | | | |
|---|---|---|---|
| 4,656,463 A | 4/1987 | Anders et al. | |
| 4,827,395 A | 5/1989 | Anders et al. | |
| 4,983,954 A | 1/1991 | Huston | |
| 5,136,463 A * | 8/1992 | Webster | 361/622 |
| 5,164,707 A * | 11/1992 | Rasmussen et al. | 340/551 |
| 5,309,571 A | 5/1994 | Huang | |
| 5,315,289 A * | 5/1994 | Fuller et al. | 340/532 |
| 5,317,309 A | 5/1994 | Vercellotti et al. | |
| 5,673,037 A | 9/1997 | Cesar et al. | |
| 5,682,142 A | 10/1997 | Loosmore et al. | |
| 5,732,401 A | 3/1998 | Conway | |
| 6,853,303 B2 * | 2/2005 | Chen et al. | 340/573.1 |
| 6,897,783 B2 | 5/2005 | Zeng et al. | |
| 7,142,118 B2 | 11/2006 | Hamilton et al. | |
| 7,323,988 B2 * | 1/2008 | Krstulich | 340/572.1 |
| 7,327,252 B2 | 2/2008 | Goehler | |
| 7,417,547 B2 | 8/2008 | Kennedy | |
| 7,633,387 B2 * | 12/2009 | Carmichael et al. | 340/539.13 |
| 2004/0100384 A1 * | 5/2004 | Chen et al. | 340/572.1 |
| 2005/0114154 A1 * | 5/2005 | Wolkowicz et al. | 705/1 |
| 2005/0148339 A1 * | 7/2005 | Boman et al. | 455/456.1 |
| 2005/0231320 A1 * | 10/2005 | Ackermann | 337/206 |
| 2006/0077609 A1 * | 4/2006 | Bender et al. | 361/93.1 |

(Continued)

OTHER PUBLICATIONS

International Search Report of PCT/US08/70927; Oct. 1, 2009; 8 pages.

(Continued)

*Primary Examiner* — Wayne Young
*Assistant Examiner* — An T Nguyen
(74) *Attorney, Agent, or Firm* — Armstrong Teasdale LLP

(57) ABSTRACT

Electronic monitoring systems and methods for detecting and verifying the adequacy of personal protective equipment needed by a person to complete a potentially hazardous task. Items providing different predetermined levels of protection may be identified and evaluated in light of specific risk potentials posed at specific locations, such as different portions of energized electrical circuitry presenting different arc flash hazard risks. Individuals may also be identified and determined to be authorized or unauthorized to perform a potentially hazardous task at a specific location. Confirmation features, alarm features, and event logs may be provided, and the monitoring systems and methods may be integrated with circuit protector monitoring systems and functionality.

36 Claims, 15 Drawing Sheets

U.S. PATENT DOCUMENTS

| | | | |
|---|---|---|---|
| 2006/0087397 A1* | 4/2006 | Henricks et al. | 337/265 |
| 2006/0125623 A1* | 6/2006 | Appelt et al. | 340/521 |
| 2006/0208857 A1 | 9/2006 | Wong | |
| 2006/0268482 A1* | 11/2006 | Lin et al. | 361/62 |
| 2006/0273894 A1* | 12/2006 | Goehler | 340/539.13 |
| 2007/0008138 A1 | 1/2007 | Mosher, Jr. et al. | |
| 2007/0182556 A1 | 8/2007 | Rado | |
| 2007/0242402 A1* | 10/2007 | Papallo et al. | 361/63 |
| 2007/0250411 A1 | 10/2007 | Williams | |
| 2008/0007404 A1 | 1/2008 | Albert et al. | |
| 2008/0030359 A1 | 2/2008 | Smith et al. | |
| 2008/0081516 A1* | 4/2008 | Brandt et al. | 439/638 |
| 2008/0088447 A1* | 4/2008 | Flores et al. | 340/572.1 |
| 2008/0088454 A1 | 4/2008 | Flores et al. | |
| 2008/0093932 A1 | 4/2008 | Whitt et al. | |
| 2008/0136649 A1* | 6/2008 | Van De Hey | 340/573.1 |
| 2009/0040014 A1* | 2/2009 | Knopf et al. | 340/5.1 |
| 2010/0045464 A1* | 2/2010 | Knopf et al. | 340/573.1 |
| 2010/0188187 A1* | 7/2010 | Mughal et al. | 337/225 |

OTHER PUBLICATIONS

International Search Report for PCT/US08/70927; Oct. 1, 2008; 8 pages.

\* cited by examiner

SYSTEM AND METHODS FOR ENSURING PROPER USE OF PERSONAL PROTECTIVE EQUIPMENT FOR WORK SITE HAZARDS

CROSS REFERENCE TO RELATED APPLICATIONS

This application is a continuation application of U.S. patent application Ser. No. 11/890,695 filed Aug. 7, 2007 and now issued U.S. Pat. No. 8,207,858, the complete disclosure of which is hereby incorporated by reference in its entirety.

BACKGROUND OF THE INVENTION

This invention relates generally to protective gear for persons working in and around hazardous locations, and more specifically to monitoring and detection systems to ensure appropriate use of protective gear.

It is sometimes necessary in a variety of industries for workers to enter potentially hazardous environments. To protect the human body from such hazards, various types of personal protective equipment (PPE) have been developed to reduce a likelihood of worker injury on the job. Governmental regulations are now in place that require certain employees to be trained in the proper use of appropriate protective equipment and to use the equipment effectively in working environments that call for them. Despite proper training in the use of such gear, however, a risk remains that workers in the field will not use the appropriate equipment, either intentionally or inadvertently, in certain hazardous environments. Managing such risks is of particular concern to employers.

SUMMARY OF THE INVENTION

According to an exemplary embodiment, a monitoring system for ensuring a proper use of personal protective equipment for potential hazards presented to a person while servicing energized electrical circuitry is disclosed. The system comprises an equipment identification element coupled to at least one item of the personal protective equipment to be used by a person, with the at least one item of the personal protective equipment being adapted to provide protection to the person in the event of an arc flash incident occurring while the person is servicing the energized electrical circuitry. A detector is located proximate a portion of the energized electrical circuitry, and a processor-based device is configured to determine, based upon a detected characteristic of the equipment identification element, whether the personal protective equipment is appropriate in light of a potential arc flash energy intensity corresponding to the portion of the energized electrical circuitry to be serviced.

Many variations of such a system are possible, and may include for example, optional features such as an activation element located proximate a portion of the energized electrical circuitry. The detector may be configured to communicate with the equipment identification element only after the activation element is manipulated by a person. The activation element may be selected, in exemplary embodiments, from the group consisting of a pushbutton, a lever, a toggle switch, a keypad, and a magnetic card reader. The activation element may be mounted to an electrical cabinet containing the energized electrical circuitry, and the processor-based device may be configured to log occurrences wherein the activation element is manipulated and the appropriate personal protective equipment is not determined.

In further embodiments, the detector may be mounted to an electrical cabinet containing the energized electrical circuitry. Energized electrical circuitry may optionally be contained in the electrical cabinet, with the cabinet having a plurality of access doors each respectively exposing a portion of the electrical circuitry when opened. Each of the plurality of access doors may be lockable by the processor-based device, and unlockable by the processor-based device when the appropriate personal protective equipment is detected.

An indication device may optionally be located proximate the energized electrical circuitry, with the indication device identifying to a user whether the appropriate personal protective equipment has been detected. The indication device may comprise lights displayed in one of at least two colors, and the respective colors when lit indicating the presence or absence of the appropriate personal protective equipment. The lights may include light emitting diodes of different colors. The indication device may also include a representation of a human person and associated items of personal protective gear, and the indication element may identifies, via the representation of the human person, which of the items of personal protective gear are detected or undetected by the detector.

A worker identification element may also optionally be provided, with the worker identification element identifying an individual associated with the personal protective equipment. The processor-based device may be adapted to determine whether the individual is authorized to service the energized electrical circuitry based upon a detected characteristic of the worker identification element. A plurality of equipment identification elements and a plurality of worker identification elements may be provided, each corresponding to a different individual respectively associated with personal protective equipment having at least one of the equipment identification elements. The detector may be configured to, based on detected characteristics of the worker identification elements and the equipment identification elements, identify all of the individuals present at the portion of the energized electrical circuitry and the personal protective equipment associated with each of the identified individuals. The indication device may be located proximate the energized electrical circuitry, with the indication device providing confirmation to the individuals regarding the number of individuals present at the portion of the energized electrical circuitry.

The system may also optionally include a lockout device, and the processor-based device may be configured to operate the lockout device and provide access to the energized electrical circuitry based upon whether the individual identified as present is authorized to service the energized electrical circuitry, and whether the appropriate equipment identification elements are detected for personal protective equipment corresponding to each of the individuals identified. The lockout device may be operated only when all individuals identified are authorized to service the energized electrical equipment and only when each of the individuals identified are determined to have the appropriate personal protective equipment. An indication device may be located proximate the portion of the energized electrical circuitry and may provide feedback to the identified individuals whether the individuals identified are authorized and whether the appropriate personal protective equipment is detected. The indication device may include at least one light indicating whether the individuals identified are authorized and at least one light indicating whether the appropriate personal protective equipment is detected.

The system may further optionally include at least one master identification element, and when the master identification element is detected by the detector, the lockout device may be operated without determining whether or not appropriate personal protective equipment is present.

The processor-based device may be configured to transmit data corresponding to detected items of personal protective equipment to a remote location. In an exemplary embodiment, the processor-based device is configured to wirelessly transmit data corresponding to detected items of personal protective equipment to a remote location.

The detector may be, for example, one of an RFID reader or interrogator, a bar code scanner, and an x-ray scanner.

The processor-based device may be configured to, after an expiration of a predetermined time interval beginning when the activation element is manipulated, cause the detector to operate to confirm the presence or absence of the equipment identification element proximate the portion of the energized electrical circuitry. If the equipment identification element is detected at such time, the processor-based device may reset the predetermined time interval, and at the expiration therefore, again cause the detector to operate to confirm the presence or absence of the equipment identification element proximate the portion of the energized electrical circuitry.

In an exemplary embodiment, the energized electrical circuitry may be contained an electrical cabinet including at least one door, the system further comprising at least one door latch sensor detecting a latched or unlatched state of the door. An alarm element may indicate the latched or unlatched state of the door. The processor-based device may be adapted to log occurrences of the door in an unlatched state.

The electrical circuitry may optionally include one or more circuit protectors provided with a sensor element, with the detector detecting an operating state of the one or more circuit protectors in addition to detecting the identification elements of the personal protective equipment. The one or more circuit protectors may optionally include a fuse.

The personal protective equipment detected by the system may include one or more of a hard hat, a face shield, a flame resistant neck protector, an ear protector, a protective suit, an insulated rubber glove, an insulated piece of footwear, and an insulated tool.

The system may also include at least one state indicator element for an electrical component, with the detector being configured to communicate with the state indicator. The electrical circuitry may include at least one circuit protector, the circuit protector received in a holder, and the holder provided with a holder identification element. The detector may also communicate with the holder identification element, allowing the system to detect a presence or absence of circuit protectors and mismatched circuit protectors.

Another exemplary embodiment of a monitoring system for ensuring a proper use of personal protective equipment for potential hazard presented to a person is also disclosed. The system includes an equipment identification element coupled to at least one item of the personal protective equipment to be used by a person, a detector located proximate a location of the potential hazard, and a processor-based device configured to determine, based upon a detected characteristic of the equipment identification element, whether the personal protective equipment is appropriate in light of the potential hazard. An activation element is located proximate the location of the potential hazard, with the detector configured to communicate with the equipment identification element only after the activation element is manipulated by a person.

Optionally, the location of the potential hazard may correspond to energized electrical circuitry. The potential hazard may also correspond to an arc flash incident occurring while the person is servicing the energized electrical circuitry.

The system may optionally include a plurality of equipment identification elements respectively coupled to different items of the personal protective equipment, and a plurality of worker elements each respectively corresponding to different individuals, with the processor-based device further configured to, in response to a single manipulation of the activation element, identify all individuals present at the location of the potential hazard and whether each of the identified individuals has the appropriate items of personal protective equipment. At least one lockout device may be provided, the lockout device being operable by the processor-based device when all individuals identified are determined to be authorized and when the appropriate personal protective equipment is identified for each of the individuals.

At least one alarm element may be provided indicating the state of the lockout device. The processor-based device may optionally be configured to temporarily postpone activation of the alarm element in response to manipulation of the activation element. The processor-based device may be configured while the lockout device remains open, to cause the detector to operate after an expiration of a predetermined time interval and identify all individuals present at the location of the potential hazard and whether each of the identified individuals has the appropriate items of personal protective equipment.

At least one master identification element may be provided, with the processor-based device configured to operate the lockout device whenever the master identification element is detected by the detector. Further, at least one indication device may provide feedback to the individuals present regarding whether the individuals are authorized and whether the appropriate personal protective gear has been detected. The processor-based device may be configured to log instances wherein the detector communicates with an equipment identification element and the processor-based device fails to determine that the personal protective equipment is appropriate.

An exemplary method of ensuring the proper use of adequate personal protective equipment in light of a potential hazard to a person is also disclosed. The method comprises providing a plurality of items of personal protective equipment each having at least one detectable characteristic, providing a plurality of worker identification elements each having at least one detectable characteristic and each of the worker identification elements corresponding to a person, and scanning persons at the location of the potential hazard with an electronic system detecting the characteristics of all items of personal protective equipment present at the location of the potential hazard and detecting all of the plurality of worker identification elements present at the location of the potential hazard. The method further includes distinguishing the detected items of personal protective equipment from one another, distinguishing the individuals corresponding to all of the detected worker identification elements from one another, and determining whether the appropriate personal protective equipment is present for each of the individuals.

Optionally, scanning persons at the location of the potential hazard may comprise simultaneously scanning persons at a location proximate energized electrical circuitry to be serviced. The method may optionally include providing an activation element, and commencing scanning in response to manipulation of the activation element by one of the individuals present. The electronic system may also include an indication element, and the method may comprise providing feedback to the individuals present regarding whether the appropriate personal protective equipment is present. The method may also include determining with the electronic system whether all of the individuals are authorized to respond to the hazard. The electronic system may include a lockout device, and the method may comprise preventing individuals not having the appropriate personal protective equipment from responding to the potential hazard. The electronic system may include at least one alarm element, and the method may comprise activating the alarm element when the appropriate personal protective gear is not detected. The method may optionally comprise logging scanning events and outcomes with the electronic system.

DETAILED DESCRIPTION OF THE INVENTION

Figure 1:
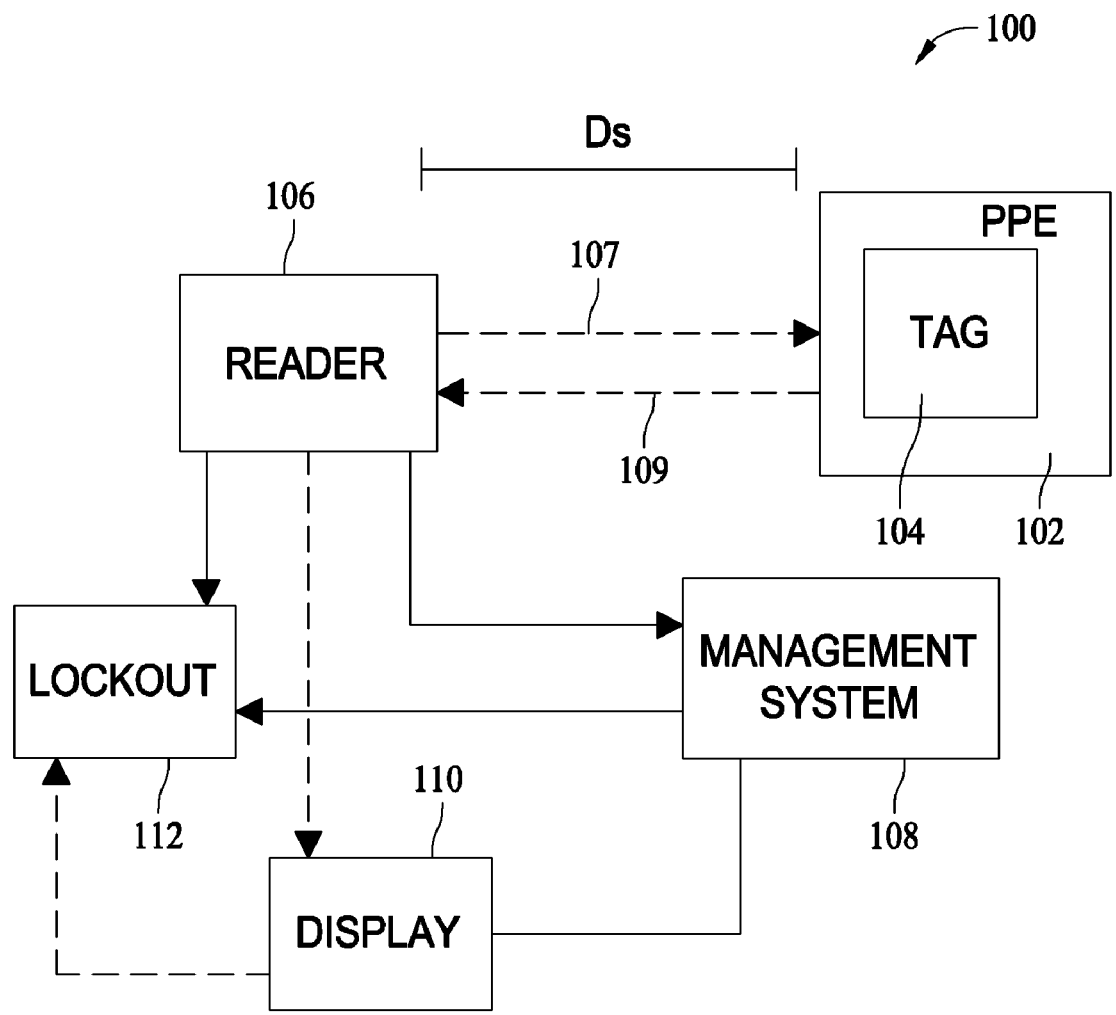
FIG. 1 is a schematic diagram of a system for ensuring the proper use of protective gear for potentially hazardous work environments.

In a first aspect, exemplary methods and systems for ensuring appropriate use of personal protective equipment by workers are disclosed herein that detect and determine the presence and adequacy of personal protective equipment associated with a particular task before workers are exposed to potentially hazardous environments. In a second aspect, exemplary methods and systems for controlling access to specified workspaces or equipment are provided. In order to appreciate the invention to its fullest extent, the following disclosure will be presented in parts, wherein Part I discusses challenges that employers face in ensuring that proper personal protective equipment is properly used; Part II discusses exemplary systems and methods for ensuring the use of personal protective equipment and for controlling access to certain workspace areas; and Part III discusses exemplary inductor assemblies for ensuring the proper use of personal protective equipment; Part IV discusses systems and methods providing enhanced monitoring of the proper use of personal protective equipment.

I. INTRODUCTION TO THE INVENTION

It is a practical reality, in certain industries, that exposure of at least some workers to hazardous, or potentially hazardous, working conditions cannot be avoided. As one example, workers in the electrical industry, and more specifically those working in and around electrical power systems, must be trained in the appropriate use of personal protective equipment to mitigate possible electrical hazards with which they may face.

Aside from hazards associated with electrical shock and electrocution when human flesh is brought into contact with energized conductive components, electrical arc flash incidents are of particular concern. Electrical arcing, or current flow between two or more separated energized conductors, may be experienced when installing, servicing, and maintaining electrical systems. Arcing may occur from electrical fault conditions and can release significant amounts of concentrated radiant energy at the point of arcing in a fraction of a second, resulting in high temperatures that may burn persons exposed to them. Additionally, arcing conditions may produce pressure blasts that are more than sufficient to knock nearby workers off their feet, and shrapnel may be generated by the blast.

Aside from fault conditions, arcing may result from human error including dropping of tools onto energized conductors, accidental contact with electrical systems, improper work procedures, and insulation failure of components used in the electrical systems, including but not limited to cables that interconnect electrical components and equipment. A build-up of dust, impurities and corrosion on insulating surfaces may also contribute to arcing conditions. Sparks generated during operation of circuit breakers, during replacement of fuses, and closing electrical connections on faulted lines may also produce an arc. Damage to components and equipment from rodents and pest infestations may result in arcing conditions. Considering the number of potential causes of electrical arcing, instances of electrical arcing are not predictable.

Accordingly, personal protective equipment that is adequate or sufficient to provide at least a minimum level of protection to persons against potential electrical hazard has been developed for practically the entire human body, such as for example, shock, arc flash and arc blast. For example, persons wearing such personal protective equipment may be reasonably protected from potentially hazardous arc flash incidents and may avoid or reduce the likelihood of serious injury if such an arc flash incident occurs. Examples of personal protective equipment may include a hard hat, a face shield, a flame resistant neck protector, ear protectors, a Nomex™ suit, insulated rubber gloves with leather protectors, and insulated leather footwear. Insulated tools may also be provided to complete certain tasks. Such personal protective equipment may be fabricated from various materials to provide, among other things, thermal insulation protection to prevent severe burns to human flesh during high temperature arcing conditions, and to mitigate pressure blasts and shrapnel to avoid life-threatening wounds to a worker's head and torso if arcing conditions were to occur.

The amount, type and quality of personal protective equipment necessary for a particular task in an electrical power system will vary according to the potential arc hazard of the worker for different tasks. For example, in the case of electrical fuses that need replacement under energized circuit conditions, fuses of higher electrical ratings may pose a greater risk than fuses of lower electrical ratings, and different amounts or types of personal protective equipment may be required for replacing one fuse, for example, than for replacing another fuse.

The selection of the required thermal rating of personal protective equipment depends on the incident energy level at the point of work. Flash energy analysis is typically required as a threshold inquiry to determine the arc flash boundary and incident energy level, and a thermal level of the personal protective equipment is matched accordingly with the calculated flash energy. Formulas for conducting the arc flash analysis are known and published for example, in the Institute of Electronic and Electrical Engineers (IEEE) Std. 1584 and the National Fire Protection Association (NFPA) 70E. To properly estimate arc flash exposure hazards, the maximum bolted short-circuit current, the arcing fault current, an operating time of an arc fault interrupting element associated with the point of interest, and a distance from an expected arc to the worker must be determined. In general, incident energy increases as the arc time and fault current increases. Software is available for analyzing arc flash exposure that may be used to determine suitable thermal ratings for particular tasks.

Personal protective equipment may provided in different levels or grades having different thermal insulation properties and ratings to meet specific needs. That is, multiple sets of personal protective equipment may be available with ranging insulating or thermal properties required for certain work sites. Thermal properties may be increased, for example, with material selection used to fabricate the personal protective equipment, by using heavier fabrics, by introducing additional layers of fabric and materials into the personal protective equipment, and by other methods known in the art. A low grade of personal protective equipment may therefore be worn for jobs that pose arcing concerns of lower intensity and a higher grade of equipment may be worn for jobs that pose greater concerns of arcing concerns. Because of the different grades of personal protective equipment, there is at least some risk that the user may choose the wrong grade of personal protective equipment needed for a particular job, which can have particular consequences if the grade of personal protective equipment utilized is less than desired or necessary. Potential confusion regarding which type or grade of the personal protective equipment should be worn is of particular concern. Preferably, personal protective equipment is required regardless of whether power has been turned off to a particular area, or to a particular piece of equipment which is scheduled for service.

Managing inventories of personal protective equipment, including the various grades thereof, for large electrical systems and a large number of workers is difficult, and facilities management must in general rely on its employees to locate and use the proper type and grade of personal protective equipment for each situation encountered. However, even conscientious workers may make mistakes, and the occasional stubborn worker that refuses to wear the proper personal protective equipment for a given task puts himself and potentially others at risk. It would be desirable to provide an effective way to monitor and detect the proper use of personal protective equipment for hazardous work environments such as those encountered in electrical power systems.

II. EXEMPLARY INVENTIVE SYSTEMS AND METHODS

Exemplary sensor systems are described herein that in one embodiment include sensor devices, sometimes referred to as sensor tags, that are embedded in personal protective equipment. When used with a detection system, the sensor tags and associated personal protective equipment may be detected, monitored and electronically verified as being appropriate or inappropriate for a given task or for a selected work site. Persons not wearing the proper personal protective equipment, as determined by the system may be denied access to locations wherein a level of personal protective equipment is insufficient. While the detection and monitoring system is described herein in the context of personal protective equipment for workers in and around electrical power systems, it is to be understood that the system may be equally applicable to other potential hazards and other types of personal protective equipment needed in both electrical and non-electrical systems. Non-electrical hazards such as chemical hazards and hazards associated with mechanical machinery, for example, may also benefit significantly from the systems and methods described below for ensuring the proper use of protective equipment and protective gear for workers.

FIG. 1 is a schematic diagram of an exemplary system 100 for ensuring the proper use of personal protective equipment by workers exposed to potentially hazardous environments, such as electrical workers that may be exposed to potential electrical arcing conditions. As shown in FIG. 1, the system 100 may include personal protective equipment 102 provided with a relatively low cost inductor assembly, often referred to as a sensor tag 104. The personal protective equipment 102 may in an exemplary embodiment include, but is not limited to, one or more of: a hard hat, a face shield, a flame resistant neck protector, ear protectors, a Nomex™ suit, insulated rubber gloves with leather protectors, and insulated leather footwear. A sensor tag 104 may be provided in each item or piece of personal protective equipment 102, or in a representative item of the personal protective equipment 102.

As previously mentioned, different grades or levels of personal protective equipment 102 may be provided by an employer for use by workers. In one embodiment, various levels of personal protective equipment may be provided that correspond to different levels of thermal insulation each corresponding to a different severity or intensity of arc flash that may be encountered in a particular electrical system. The personal protective equipment 102 may be accordingly grouped into sets wherein each set includes a complete group or set of personal protective equipment 102 meeting specific thermal requirements, padding and protection, etc. for tasks corresponding to one of the designated severity levels of arc flash. Each set can include items of personal protective equipment for different parts of the worker's body that are to be used in combination with one another, such as, for example, a hard hat, a face shield, a flame resistant neck protector, ear protectors, a Nomex™ suit, insulated rubber gloves with leather protectors, and insulated leather footwear. The sets may be identifiable by workers for example, with labels, tags, graphics, colors, or indicia that identify a level or grade of particular gear.

For example, the different pieces or items of gear may be labeled with numbers on the understanding that workers would only don personal protective equipment 102 having numbers that match one another, and that match the severity or risk level for the job to be undertaken. As another example, the personal protective equipment 102 may be color coded so that orange equipment, for example, may correspond to one severity level, yellow equipment may corresponds to another level, and still other colors of equipment are provided for the remaining levels. Various other coordination schemes may be utilized to demarcate and distinguish one grade of personal protective equipment 102 from another.

In one embodiment, for each set of personal protective equipment 102, one representative item, such as the right hand glove, may be provided with the sensor tag 104. In another embodiment, sensor tags 104 may be provided in each and every piece of personal protective equipment 102 available for use. The sensor tags 104 may be, for example, embedded in layers of fabric in the personal protective equipment, sewn or stitched within the personal protective equipment 102, or otherwise, affixed, secured and attached to the personal protective equipment.

The sensor tag 104 may communicate across an air interface with another device, typically referred to as a reader or interrogator 106. Communication between the reader 106 and the sensor tag 104 may occur via radio frequency signals, and the system 100 may operate according to what is commonly known as a radio frequency identification (RFID) system operating on close proximity electromagnetic or inductive coupling of the reader 106 and sensor tag 104, or alternatively operating using propagating electromagnetic waves. The reader 106, by virtue of the sensor tag 104 present in the protective equipment 102 may detect the presence of, or the type or grade of, the personal protective equipment 102 that is present.

More specifically, the reader 106 may be configured or adapted to communicate with the sensor tag 104 via, for example, wireless radio frequency (RF) signals. In accordance with known systems, such as RFID systems, the reader 106 can generate a signal 107 that excites an inductor coil, described below, of the sensor tag 104 and causes it to resonate at a predetermined frequency. The sensor tag 104 can provide a return signal 109 to the reader 106 at the resonant frequency. Thus, by generating signals 107 and collecting return signals 109, the reader 106 may detect the sensor tag 104 and the associated personal protective equipment 102. The reader 106 and the sensor tag 104 may communicate over an air interface and special separation of a distance $D_S$ that is, for example, 12 to 18 inches, 18 to 24 inches, 24 to 36 inches, up to 4 feet, up to 5 feet, up to 6 feet, up to 7 feet, up to 8 feet, up to 9 feet, or up to 10 feet. Methods of transmission over long distances may be dependent upon the use of a stronger antenna signal, which is known in the art, and also considered for use in the present invention.

The sensor tags 104 for different levels of the personal protective equipment 102 may be fabricated to provide a different frequency response for each level or grade of equipment. By reading the frequency response of the sensor tag or tags 104, the reader 106 and an associated computer system, referred to as a management system 108 in FIG. 1, may monitor the presence or absence of adequate personal protective equipment 102 for a particular task. The management system 108 in an exemplary embodiment may be a processor-based device such as a personal computer or notebook computer programmed in a manner to achieve the functionality described below.

In one embodiment, the sensor tags 104 can be formed in a manner, explained below, that provides sufficient signal strength for reliable signal transmission and detection of the personal protective equipment 102 by the reader 106 within the spatial distance $D_S$. The reader 106 may be a processor-based hand-held device that may be used in a scanning motion over the personal protective equipment 102, or the reader 106 may be mounted in a fixed or stationary location with one or more items of the personal protective equipment passed before it to detect the sensor tags 104. The reader 106 may be a conventional reader device, such as a known non-optical reader used in, for example, conventional REID systems or other electromagnetic detection systems that are well known. If desired, intelligence may be implemented in the reader 106 and sensor tag 104, and a communications protocol may be established so that the system 100 may be utilized for purposes other than simple detection of the sensor tag 104. Depending upon the sophistication of the communications protocol, the sensor tag 104 may be specifically identified by the reader 106 and data may even be exchanged between the sensor tag 104 and the reader 106 via the signals 107 and 109.

In one embodiment, more than one reader device 106 may be provided in different locations, with each location selected to detect protective gear for specific parts of the body. In such an embodiment the personal protective equipment 102 may be worn by a worker and the worker may be required to walk through a screen or gate having a reader 106 mounted near the floor to detect protective footwear, a reader 106 mounted at about the level of a worker's waist to detect the presence of protective overalls or a jacket, and a reader 106 mounted at the worker's eye level to detect the presence of a hardhat or face shield. Providing various readers 106 at varying locations and elevations may allow simultaneous detection and analysis of a full spectrum of protective equipment that is actually being worn by a user. That is, each item of protective equipment in a set of protective gear may be specifically identified and verified as being the proper grade for a given task to be performed in an electrical system. Depending on the location of the sensor tags 104 in the personal protective equipment 102 and on the position of the readers 106, more than one sensor tag 104 may be detected by the same reader 106.

Alternatively, a single reader 106 may be used to identify a single sensor tag 104 located only in a representative item of personal protective equipment 102, such as a glove. It would be assumed in such a scenario that if the grade of the representative item is determined to be proper, a worker would employ the complete set of personal protective items of the same grade.

In different embodiments, the reader or readers 106 may be located in a room, for example, wherein the personal protective equipment 102 is stored, may be located at an access point such a door beyond which the personal protective equipment 102 must be worn, or may be located at the job site itself. As one example, a reader 106 may be located on an electrical panel door providing access to certain circuit protectors such as fuses in an electrical system.

The reader 106 and/or the management system 108 may be programmed with a look up table, for example, of a variety of tasks, the severity level of potential hazards such as arc flash associated with each task, and the level of personal protective equipment 102 that is appropriate for each task. The look up table in one example includes a comprehensive list of fuses utilized in an electrical system, a task code for each fuse, a severity level for arc flash events for each fuse if they were to occur, and a recommended level of personal protective equipment 102 when servicing each fuse. When an open fuse event occurs, for example, the worker may enter a task code corresponding to the fuse needing replacement to either the reader 106 or the management system 108, and using the look up table the reader 106 may determine whether the frequency response from the sensor tags 104 in the personal protective equipment 102 matches the expected frequency response for the specified level of the personal protective equipment needed for the task.

In an exemplary embodiment, the table of tasks and corresponding personal protective equipment 102 may be posted on the wall of a room, for example, where the personal protective equipment 102 is stored, which the worker may consult to enter a task code for use by the reader 106 and the management system 108. A display 110 may be associated with the reader 106 and/or the management system 108 to provide for visual confirmation of the task code, as well as to present additional information and instruction to the user for safe completion of the task, The display 110 may be a touch screen or touch sensitive panel in which the user may select a task to be accomplished. After selecting a task, the display 110 may direct the user to a storage locker, for example, wherein the proper personal protective equipment may be found. Additionally, when presented to the reader 106, detected protective gear may be communicated to the user via the display 110, and indication may be provided whether or not the proper protective equipment 102 has been selected.

For at least the reasons set forth above, the system 100 may effectively determine whether a worker has located personal protective equipment 102 that matches the requirements associated with the task at hand. Potential confusion and mismatching of personal protective equipment 102 may be largely, if not completely, corrected by the system 100 before the worker is exposed to potentially hazardous conditions such as arc flashing.

For still further assurance of safety of the worker or workers, the reader 106 and/or the management system 108 may communicate with a lockout device 112 that physically prevents access to potential hazards unless the proper protective gear is present and properly utilized. For example, the lockout device may be implemented as a locked door of an equipment room, with the door lock being controlled by the reader 106 and/or the management system 108. In such a scenario, the worker who does not have the proper protective equipment 102, as determined by the system 100, may not pass through the door to gain access to circuitry and fuses, for example, that could present an arc flash event. As another example, the lockout device could be implemented in a locking mechanism of a door of an electrical panel, and unless the proper protective equipment 102 is determined by the system, the door of the panel may not be opened to access circuitry and one or more circuit protector such as fuses. Various locking mechanisms are known that could be remotely controlled and actuated by the management system 108, any of which may be used as the lockout device 112. In one embodiment, instructions from the lockout device 112 may be overridden. In another embodiment, the lockout device 112 may be programmed to override a "lock out" event, based upon the personal protective equipment that is being worn, the identity of the worker, the conditions of the "locked" work space, or a combination of the above.

The override system can be programmed to function in response to the identity of a particular person or event and may be done at the local level or from a remote location. For example, at the local level, i.e., at the location of the equipment to which access is being controlled, there are two levels of override: local manual override and local automatic override. Local manual override requires the input of a code, password, or the like, by an individual, at a user interface located at or in close proximity to the access point or piece of equipment. Local automatic override requires that the system, at the local level, be pre-configured or pre-programmed to override a "lock out" event, based upon some predetermined parameters. Examples of pre-determined parameters include, but are not limited to, the power being disconnected from a piece of equipment to be serviced, the identity of the individual seeking access, adequate (but not ideal) personal protective equipment 102, or some other similar event. Similarly, at the remote level, there are two levels of override: remote manual override and remote automatic override. Remote manual override requires the input of a code, password, or the like, or may provide an option for a manager, or other person having authority, to allow access and override the "lock out" event. Remote automatic override requires that a control system located at a remote location be preprogrammed to override the "lock out" event based upon a person's identity, personal protective equipment 102, training, or other factor.

In still another embodiment, the personal protective equipment 102 may be stored in locked cabinets or lockers that are controlled by the management system 108, and when a task code is input to or otherwise selected by a user, only the cabinets or the lockers containing the proper personal protective equipment 102 may be unlocked for use by workers. The reader 106 in such an embodiment may be used as a verification tool for the equipment stored in the lockers or cabinets, thereby providing a degree of redundancy to the system 100. The reader 106 may also be used as a check-in device after completion of the task to ensure that personal protective equipment 102 is stored in the appropriate locker or cabinet. That is, the reader 106 may detect the level and type of personal protective equipment 102, and unlock only the proper storage lockets, cabinets or containers for the personal protective equipment 102 for storage. The reader 106 and the management system 108 may be utilized in such a manner for inventory tracking purposes by detecting and monitoring a check-in and check-out of personal protective equipment 102. Usage and event histories may be archived in the reader 106 and the management system 108 for access by facility management for further study and analysis.

Figure 2:
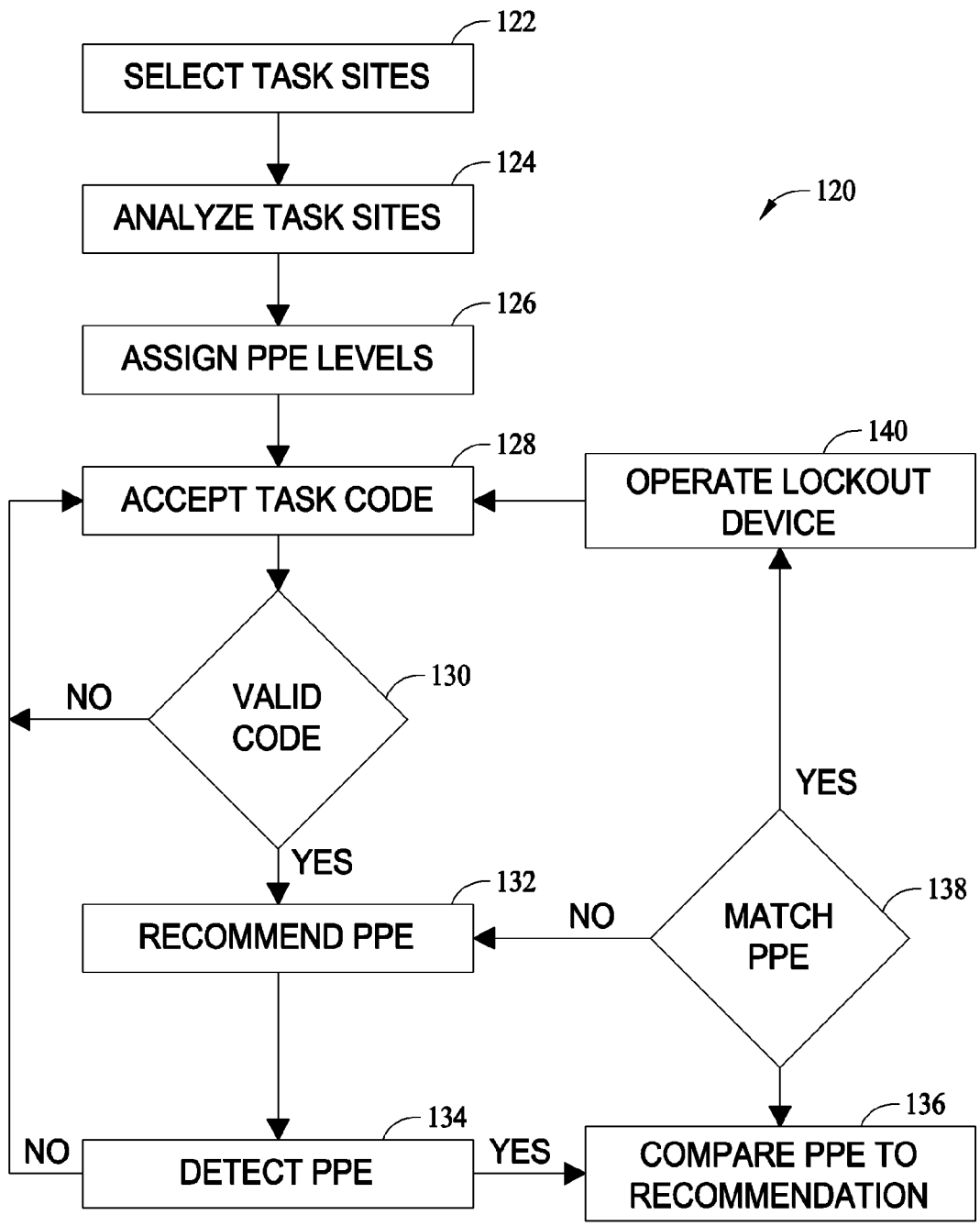
FIG. 2 is a flowchart of a method that is executable by the system shown in FIG. 1.

FIG. 2 illustrates an exemplary method 120 that may be utilized by the system 100 (shown in FIG. 1) in one embodiment. Specifically, the method can be implemented in a processor-based device. As used herein, the term "processor-based device" shall refer to computers, processors, microprocessors, microcontrollers, microcomputers, programmable logic controllers, reduced instruction set (RISC) circuits, application specific integrated circuits and other programmable circuits, logic circuits, equivalents thereof, and any other circuit or processor capable of executing the functions described below. The above examples are exemplary only, and are thus not intended to limit in any way the definition and/or meaning of the term "processor-based device", however processor-based device shall specifically include hand-held devices.

In one example, the method may be implemented in a processor-based device such as a microcomputer or other processor, and a memory that stores executable instructions, commands, and control algorithms, as well as other data and information required to satisfactorily operate the system as explained below. The memory of the processor-based device may be, for example, a random access memory (RAM), although other forms of memory could be used in conjunction with RAM memory, including but not limited to flash memory (FLASH), programmable read only memory (PROM), and electronically erasable programmable read only memory (EEPROM). The physical implementation of the method 120 may further be accomplished in discrete devices, including but not limited to the reader 106 and the management system 108 described above, or a single device.

The method 120 can include determining or selecting 122 task sites wherein workers will be asked to perform jobs, such as servicing of fuses in an electrical system. Thus, for example, a list of the fuses, the locations of the fuses, and a task code for each fuse may be compiled.

Once the sites are identified and selected 122, the sites may be analyzed 124 to assess the potential hazards or risks that the sites may present to workers. The analysis is performed as a risk assessment of the sites where the tasks are to be performed, and may include, among other things, potential exposure to an arc flash. Arc flash analysis may be conducted according to well known procedures, formulas, and known software packages described above. Incident arc energy exposure at each site, determined as part of the analysis, may then be the basis for assigning personal protective equipment levels 126 for each of the sites identified in step 122. The sites 122 and the assigned personal protective equipment levels from step 126 may then be input or programmed into a processor-based device, which may be the management system 108 (FIG. 1) and/or the reader 106 (also shown in FIG. 1), or still another device. Assigning of the personal protective equipment levels at step 126 may also include designating a unique frequency response for each personal protective equipment level that may be used as baseline reference values by the reader 106 to identify the personal protective equipment level and to distinguish the personal protective equipment 102 levels from one another.

Once the frequency response is determined for each grade of personal protective equipment, sensor tags 104 that exhibit the determined frequency responses may be provided in the personal protective equipment 102 at each level or grade. For each different grade of personal protective equipment that is supplied, a different sensor tag is utilized so that sensor tags 104 in different grades of gear will exhibit different frequency responses.

When a task is to be completed that requires the use of personal protective equipment 102, the system may accept 128 a task code from a user, and may then determine 130 whether the task code corresponds to one of the tasks and sites determined in step 122. At step 128, additional codes and identifiers may be also accepted by the system, including but not limited to worker identification codes and passwords to prevent unauthorized persons from accessing the system.

If the accepted task code at step 128 does not correspond to one of the tasks and sites determined in step 122, the task code is invalid and the user is prompted to enter another task code for acceptance by the system at step 128. If the accepted task code does correspond to one of the tasks and sites determined at step 122, the system may recommend 132 a personal protective equipment level to the user for the user's use in performing the task.

The recommendation at step 132 corresponds to the assigned personal protective equipment level determined for the task site at step 122 that corresponds to the valid task code accepted by the system at step 128. The recommendation may be presented to the user via the display 110 (FIG. 1) or by other audio or visual means. When a user receives the recommendation, the user may proceed to locate the appropriate personal protective equipment 102 and clothe himself or herself in it. The recommendation may also provide confirmation to the user of the task code and the task to be performed, and present an opportunity for the user to enter another task code if an inadvertent error in entering the task code resulted in a valid, but incorrect task code that does not correspond to the task to be performed.

Once the personal protective equipment 102 is located, the user may approach the system reader with the personal protective equipment 102. When the spatial separation between the equipment and the reader is within the operating distance $D_S$ (FIG. 1), the personal protective equipment 102 is detected 134 via the sensor tag or tags embedded within the protective equipment. If personal protective equipment 102 is detected at step 134, the system compares 136 the detected personal protective equipment 102 via the resonant frequency of the sensor tag or sensor tags 104 with the baseline frequency to be expected for the specific task in accordance with the assigned personal protective equipment 102 levels at step 126. If at step 138 the detected equipment matches the recommended equipment, the system operates 140 the lockout device so that the worker may obtain access to the job site to complete the task. As used herein, "matches" shall refer to situations wherein the detected resonant frequency of the sensor tags is equal to the expected baseline frequency for the assigned personal protective equipment level, or is within a reasonable tolerance band around the baseline frequency.

An example of a reasonable tolerance band may be a frequency that is plus or minus ten percent of the expected frequency, although other ranges both greater and smaller in percentage terms may be appropriate in some embodiments. Some deviation between the detected frequency and the expected frequency is to be expected and may be tolerated, and the degree of deviation may be largely dependent on the frequency separation between the baseline reference values of the sensor tags 104 for each grade of personal protective equipment. When the baseline reference values are farther apart from one another, a greater amount of deviation between detected frequencies and expected frequencies may be tolerable.

If at step 138 the detected personal protective equipment 102 does not match the recommended personal protective equipment, the system returns to step 132 to recommend the proper personal protective equipment to the user and invites the user to locate the proper personal protective equipment.

If no equipment is detected at step 134, the system may time out after a predetermined lapse of time and return to accept another task code.

Steps 128 through 140 in FIG. 2 may be repeated for each worker needed to complete a task, and all accepted codes, recommendations, detection events, and operation of lockout devices may be recorded in a database or in memory storage on the management system 108, the reader 106 or elsewhere in the system. Detailed histories of both the system performance and user performance in locating and using the proper personal protective equipment 102 may be complied for study and evaluation, as well as for protective inventory equipment tracking and evaluation purposes. Among other things, data collected by the system may be utilized to determined an optimal amount of personal protective equipment for each severity level assigned at step 126 based on actual use requirements. Attempts may also be undertaken, based on data collected by the system, to predict future needs for personal protective equipment.

Manual over-ride features may also be built-in to the system and method to disable the system and method in case of malfunction or wherein operation of the system may frustrate or delay emergency procedures.

The system and method are believed to be relatively straightforward for users to grasp and users may therefore be trained relatively quickly in a short demonstration to personnel who are hired to perform tasks, if necessary, that require personal protective equipment 102.

Varying degrees of sophistication may be provided in the system 100 and method 120 described above. Some of the system features and method steps described above may be considered optional in some embodiments, and other system features and method steps may be added without departing from the scope and spirit of the invention.

In one aspect of the present invention, multiple RFID assemblies can be employed at the same time. In one embodiment, RFID assemblies can be used to identify different individuals wherein each individual is issued a separate and distinct device and signal. In another embodiment, the RFID sensor can be used to detect the identity of multiple individuals and simultaneously determine the level of protective gear being worn by each individuals. In another embodiment, the RFID sensor can be used to detect the identity of multiple individuals and simultaneously determine if the proper protective gear is being worn based upon the workspace each individual is entering.

In another aspect of the present invention, the RFID assembly 200 (FIG. 5) may be used to monitor individual employees and grant or restrict access to certain equipment or locations. Exemplary embodiments may be particularly useful in restricting access to hazardous workspaces to certain individuals having a particular training or experience level. As shown in FIG. 6, in one embodiment an RFID reader 106 and/or management system 108 can be configured to communicate with a locking mechanism 308 attached to a door 306 for a specific workspace or piece of equipment 304. In this aspect of the invention, the sensor can prevent access to individuals 302, and/or alert management to the presence of certain individuals in close proximity to certain equipment 304, based upon the signal from the RFID device 200. The management system can include a display 110 to allow a supervisor or management team member to document a worker's access or denial of access to a workspace or piece of personal protective equipment. The display may identify the individual seeking access, the level of personal protective equipment being worn, particular training, and/or security access of the individual.

Figure 7:
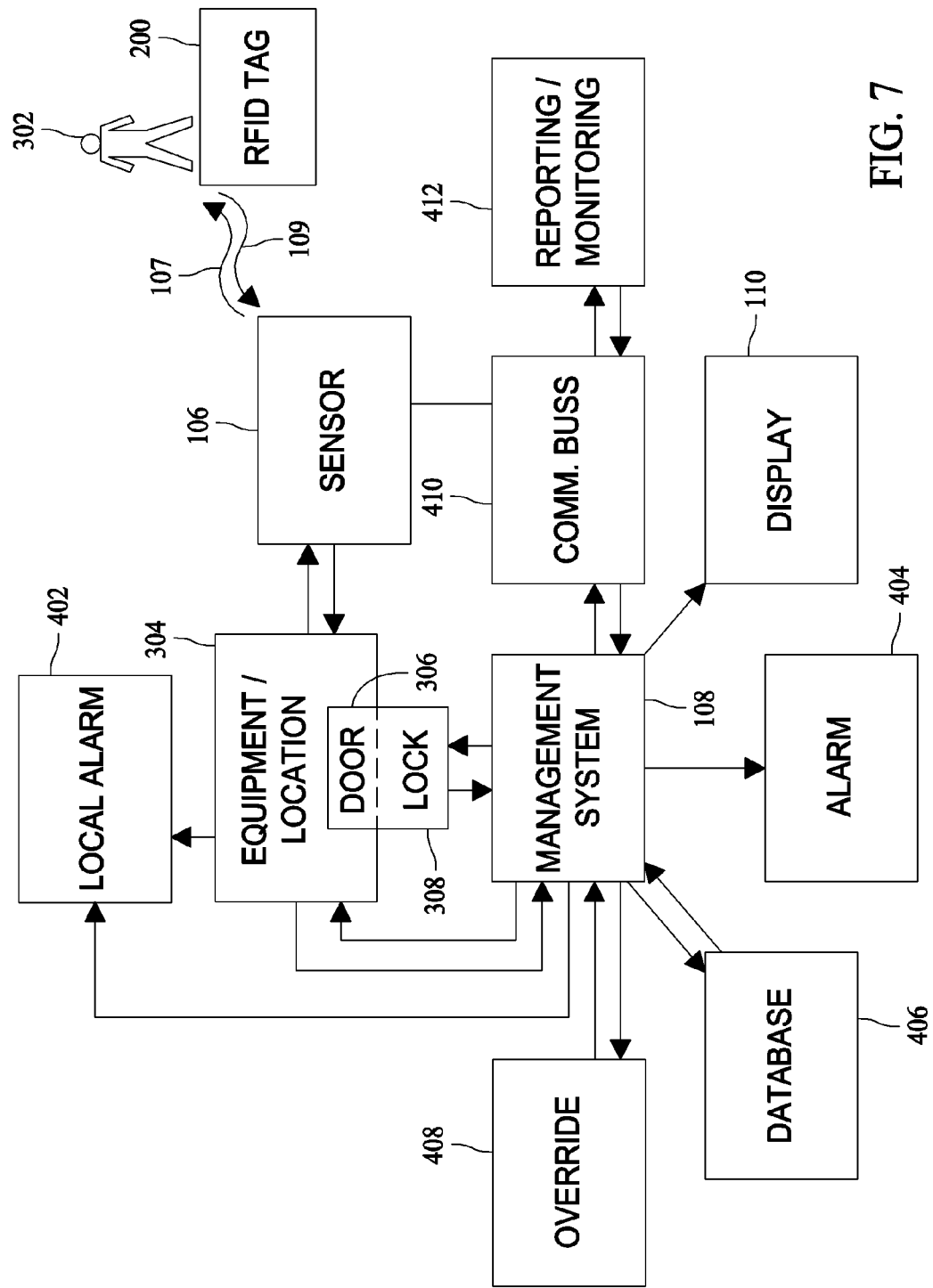
FIG. 7 is a schematic diagram of a system for the management of the use of protective gear potentially hazardous work environments.

FIG. 7 shows another embodiment of the present invention employing means for recording access data and alarms to alert appropriate personnel of an attempted access to a workspace. In this exemplary embodiment, an access point or entry to a workspace or piece of equipment 304 may be coupled to an RFID reader 106. The reader 106 sends a signal 107 to the RFID assembly 200 which, as previously described, can be carried or sewn into the clothing or personal protective equipment of worker 302. The RFID assembly 200 then generates a return signal 109, which is received by the reader 106.

The equipment or workspace 304 to which the RFID reader 106 may be electronically coupled can include a door or access point to the workspace 306 and a lock coupled thereto 308. The door lock can be operated automatically based upon a signal from the RFID reader 106 and/or electronically coupled to a management system 108.

The management system 108 can be integrated with a variety of associated devices and peripheral equipment. A local alarm 402 may preferably be directly coupled to the equipment or workspace 304, and may also be coupled to the management system 108. Upon attempted entry by an unauthorized individual, or an individual that is not wearing the proper protective gear, the local alarm 402 can be set off. The local alarm 402 preferably includes an audible alarm, but may instead, or in addition, include a visual alarm (not shown), such as for example, a flashing light.

The management system 108 may also be coupled to a remote alarm 404 which, similar to the local alarm 402, can be set off based upon an attempted entry by an unauthorized worker or a worker not wearing the proper protective gear. The remote alarm may be located in any desired location, such as for example, a command center, a manager's office, or in another workspace. In addition, the management system 108 may also be electronically coupled to a display which can display a variety of data associated with the attempted entry into the workspace, including, but not limited to, the time and date of the attempted entry, the identity of the worker, and the personal protective equipment 102 being worn at the time of the attempted entry. This information may also be supplied and stored by database 406 or may be communicated via communication bus 410 to a remote location or as a report 412.

The management system 108 may be coupled to an override system 408 which can receive a signal of a "lock out" event due to a worker's identity or lack of personal protective equipment 102. The override system 408 may be programmed to override the "lock out" event based upon the identity of the individual or event, or alternately based upon the level of personal protective equipment 102 being worn.

Figure 8:
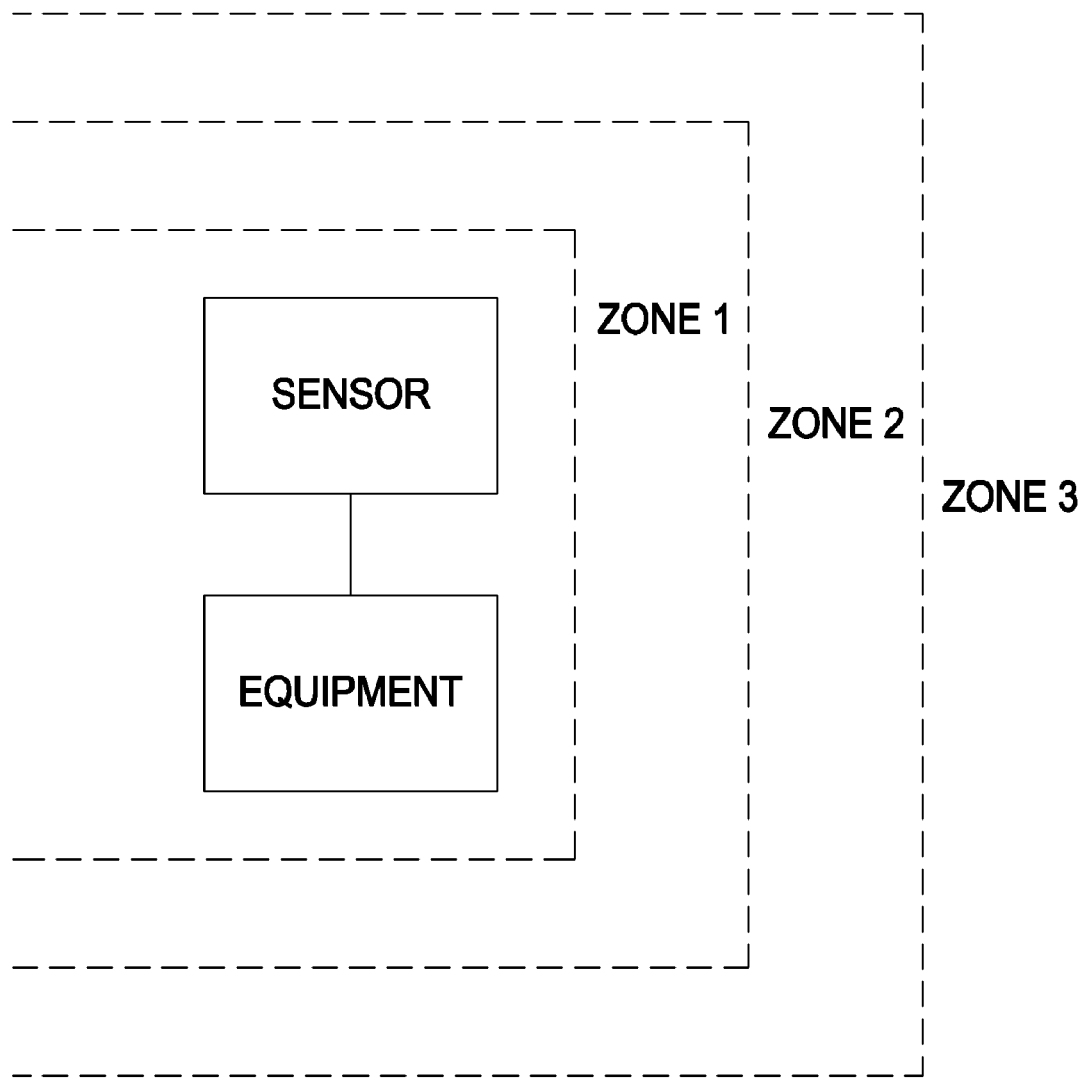
FIG. 8 is a schematic diagram of a system for controlling access to potentially hazardous work environments.

FIG. 8 shows a general schematic of a piece of equipment or location having a RFID sensor for restricted access thereof. The location or equipment may have various zones which may allow a worker to approach within a certain defined distance from a piece of equipment. For example, a hazardous piece of equipment may require an individual standing in Zone 1 to be wearing a certain level of personal protective equipment, whereas an individual standing in Zone 2 may be required to wear a lower level of personal protective equipment, and an individual standing in Zone 3 may be required to wear an even lower level of personal protective equipment. The sensor may be coupled to a display and may alternately be coupled to an alarm system. With such a system, multiple workers may be present in the same workspace, while the system monitors a presence of individuals based upon the level of personal protective equipment they are wearing.

A failsafe device may also be employed in addition to the RFID sensor system described herein and may include a pressure sensitive mat positioned directly in front of a piece of hazardous equipment such that the equipment cannot be approached by a worker without the mat being stepped on. Preferably, the pressure sensitive mat is coupled to an alarm, and may optionally be coupled to a display and/or a database to record events wherein a worker steps on the mat, thereby triggering an alarm. In some embodiments, the pressure sensitive mat may be electronically coupled to an RFID sensor and a lockout device such that if the mat is stepped on by a worker prior to the RFID sensor determining that an individual is wearing proper personal protective gear, the mat can send a signal to the lockout device to prevent access thereto. Preferably the pressure mat is adequately sensitive that a weight of greater than 50 pounds is sufficient for the mat to sense the presence of a worker.

In certain instances, specific tools are known to be required for specified service operations. Thus, in another aspect of the present invention, the RFID assembly 200 can be used to restrict access based upon the particular tool which an individual is carrying. The tools can include an RFID tag which an RFID sensor can identify to determine if the tool is appropriate for the service operation to be performed. For example, an RFID tag and RFID sensor may be employed to determine if an individual is carrying an insulated or non-insulated tool, and access granted or restricted based upon whether the individual is carrying an insulated tool. In another example, access may be granted or denied based upon whether an individual carrying testing equipment has test equipment which is properly rated for the equipment being serviced.

Generally, one aspect of the present invention is to protect maintenance personnel during service operations of hazardous equipment by restricting access when the proper protective equipment 102 is not being worn.

In another aspect, the present invention can be employed as an additional level of security by restricting access to specified workspaces depending upon the individual, or the level of personal protective equipment an individual is wearing. In a general sense, security at a location is the function of several factors, including the use of RFID tags and sensors tags to monitor and regulate access of individuals to specific areas.

In this exemplary embodiment, an RFID sensor can be configured to communicate with a lockout device associated with a door or other means of entry into a particular workspace. For example, the sensor can be used to determine whether a particular individual should be granted access to the workspace. In this regard, if an individual is not in possession of an RFID sensor, or if the individual is not in possession of an RFID sensor which has been previously identified as allowable, access will not be granted to the particular workspace. In one embodiment, the RFID sensor and lockout device may be connected to a computing device which may keep a record of all RFID devices which are brought in close proximity to the RFID sensors.

Figure 9:
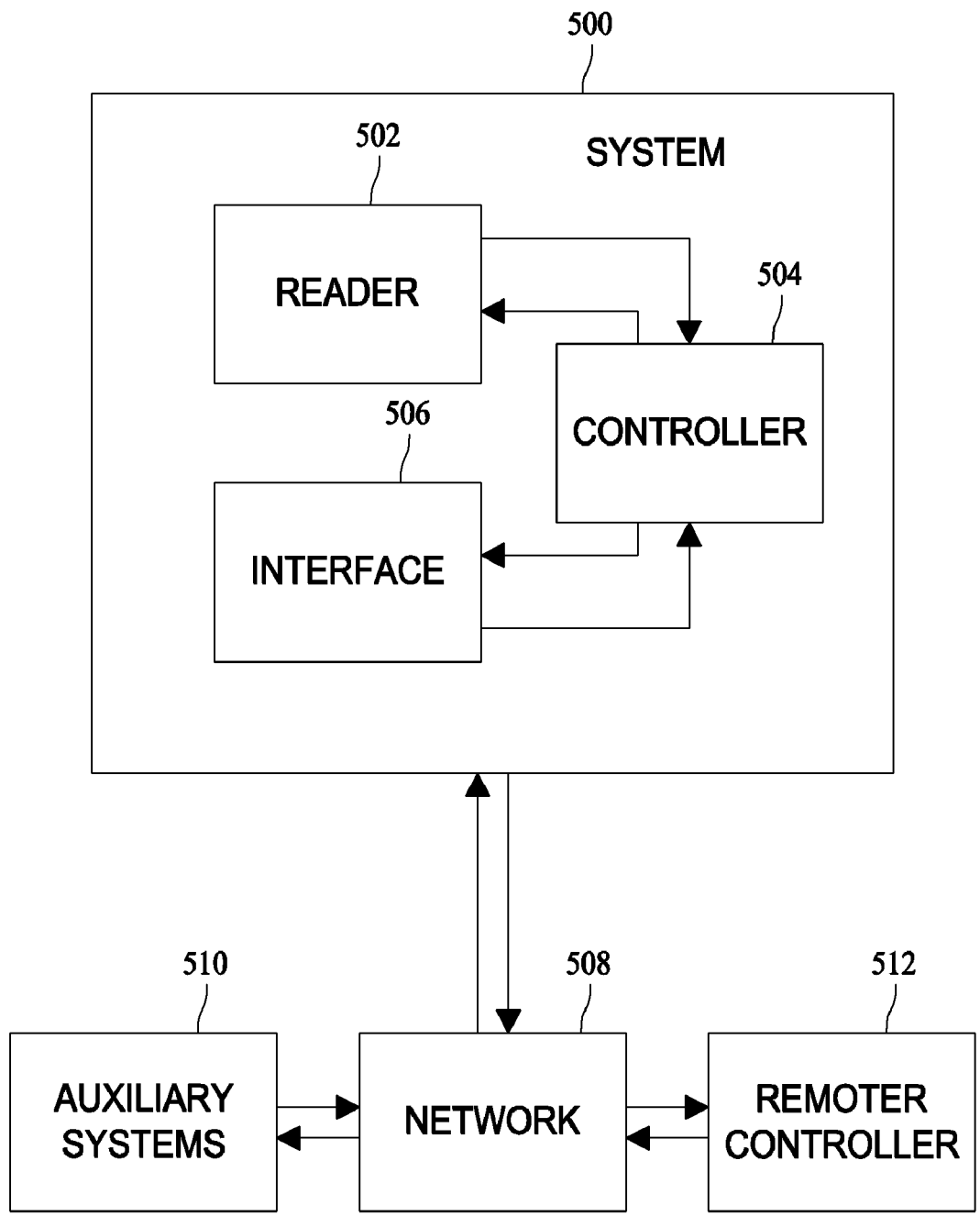
FIG. 9 is a schematic diagram of a system for accessing a system for the management of access to potentially hazardous work environments.

As shown in FIG. 9, in one exemplary embodiment the present invention provides an access control system 500 which includes a reader 502, a controller 504 and an interface 506. Reader 502 can be an RFID sensor, as previously described herein, which can be configured to detect and communicate with RFID tags to monitor the presence of individuals in close proximity to the sensor. Controller 504 can be a processor-based controller, or alternatively can be a programmable logic controller. Preferably, controller 504 is a programmable logic controller suitable for use in high temperature or dusty conditions, or in the presence of excessive electrical noise or vibration. Controller 504 is in communication with an interface 506, allowing for data to be accessed, permissions to be set on the RFID sensor and the like. Preferably, the interface 506 is located at a piece of equipment or at a door location, allowing personnel to access the controller, or the computer network at a particular location. In one embodiment, the interface may be located at a particular piece of equipment and individuals servicing the equipment may access data related to the service operation being performed at the equipment. The access control system 500 is connected to a processor-based network computer 508, providing remote access thereto. The network computer 508 is connected to a controller 512, which can be located at a remote location and accessed over the network or via the internet In addition, the network computer 508 can be connected to a variety of auxiliary systems 510, such as for example, alarm systems, secondary controllers, computer based processors, databases and the like.

In one embodiment, one auxiliary system 510 to the access control system 500 can include a reporting module (not shown), The reporting module can be configured to generate a variety of reports, including but not limited to, work logs, activity reports, maintenance reports, training records, and the like. Preferably, the reporting module may be programmed to generate customized reports. In one embodiment, the reporting module may be accessed over the internet.

The various embodiments discussed herein can also include InVision software, allowing the RFID devices to be coupled to and accessed from handheld devices. The InVision software and communication systems are described in the following patents, each of which are incorporated by reference in their entirety: U.S. patent application Ser. No. 10/828, 048, filed on Apr. 20, 2004, published on Oct. 20, 2005, entitled, "Wireless Communication Fuse State Indicator System And Method;" U.S. patent application Ser. No. 10/973, 628, filed on Oct. 26, 2004, published on Apr. 27, 2006, entitled, "Fuse State Indicating Optical Circuit And System;" U.S. patent application Ser. No. 11/223,702, filed on Sep. 9, 2005, published on Apr. 13, 2006, entitled "System and Method for Circuit Protector Monitoring and Management;" and U.S. patent application Ser. No. 11/224,526, filed on Sep. 12, 2005, published on Apr. 27, 2006, entitled, "Circuit Protector Signal Transmission, Methods And Systems."

The various embodiments discussed herein can also include a variety of passive and/or active devices for communication with the sensor means, which can be used along with, or instead of, the RFID sensor. Suitable communication means can include, but are not limited to, radio frequency devices, infrared devices, magnetic based sensors, electromagnetic based sensors, acoustic means, chipless RFID devices, and standing acoustic wave (SAW) devices. Optionally, multiple communication means can be employed together.

In one aspect of the present invention, the system can be configured such for the use of "smart cards" to monitor access to hazardous equipment and/or the use of personal protective equipment 102. In one embodiment, an individual is issued a smart card access card. The smart card can include a variety of means for being sensed by a smart card reader, including RFID. Preferably, the smart card is configured for use without physically contacting the card reader.

In one embodiment, an individual seeking to access and check out personal protective equipment scans a personal smart card at a location wherein the personal protective equipment 102 is stored. Preferably, the scanning of the smart card is done with an smart card scanner, which may include an RFID sensor. Preferably, the scanning is a contactless process. After putting on the personal protective equipment 102, the individual then attempts to access a specific location or piece of equipment which requires a particular level of personal protective equipment 102. At the access point, the individual may scan a personal smart card containing, inter alia, the identity of the individual, and may also scan a second smart card coupled to or associated with the personal protective equipment 102. The smart card scanner can then access a control module which determines whether the individual has the minimum appropriate personal protective equipment 102 and whether the individual has been granted access to the space and/or the equipment. In another embodiment, the control module may determine if the individual has proper training to service a particular piece of equipment. In certain embodiments, the identity of the individual may obtained via the RFID tag with an RFID sensor, as previously discussed herein.

In another embodiment, an individual is issued a personal smart card, and uses the smart card to cheek out adequate personal protective equipment 102 to access and service a particular piece of equipment. The smart card may include an RFID tag which can be read with an RFID sensor, thereby eliminating the need for physically "scanning" the card. In this embodiment, the card may be sensed by waving the card in front of a sensor.

The smart card may be scanned to allow access to the particular equipment. The proximity sensors, which allow for the smart card to be sensed at a distance of up to 12 inches, preferably within 8 inches. The smart card reader thereby eliminates the need for an antenna system, and the complexity that comes with such a system. In alternate embodiments, the smart card may employ a bar code which may be scanned by readers which may be coupled to the access points to the equipment.

III. EXEMPLARY EMBODIMENTS OF SENSOR TAGS

Exemplary embodiments of inductor assemblies that may be used as the sensor tags 104 for the system 100 (FIG. 1) are described below that utilize precision winding technology to provide a strong signal response and desired center frequency, also referred to as resonant frequency, with resonant circuit quality factor in a compact size or miniature size of less than, for example, 25 mm in length. Other sizes of the sensor tag 104 are also contemplated herein, such as for example, less than 15 mm in length, less than 20 mm in length, less than 30 mm in length, and less than 50 mm in length. The inventive inductor assemblies are therefore well suited for use as electromagnetic sensor tags 104 and are fully capable of delivering superior signal strength and about 100% detection accuracy when used to monitor and detect, for example, personal protective equipment 102, with known reader systems. inductor assemblies of the present invention can also be manufactured at lower cost than known inductive tags used in conventional RFID applications.

Figure 3:
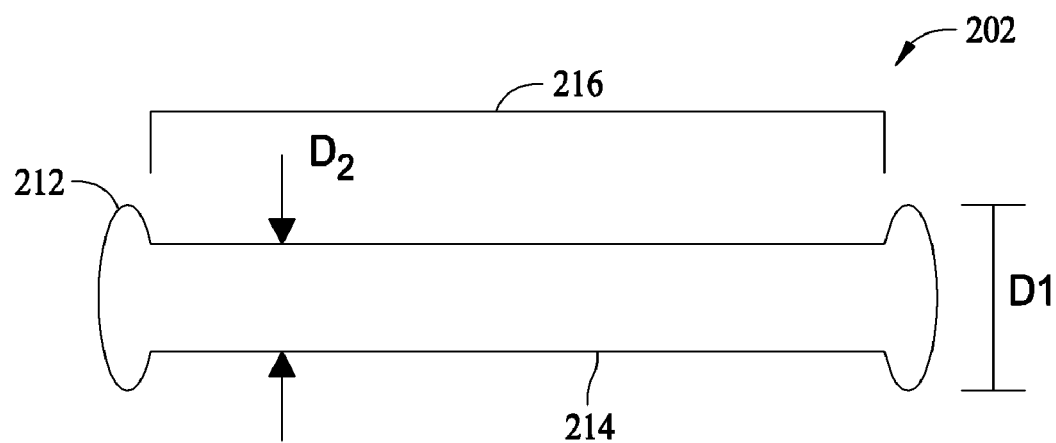
FIG. 3 is a front elevational view of an inductor assembly, at a first stage of manufacture, that may be used as a sensor tag for the system shown in FIG. 1.
Figure 4:
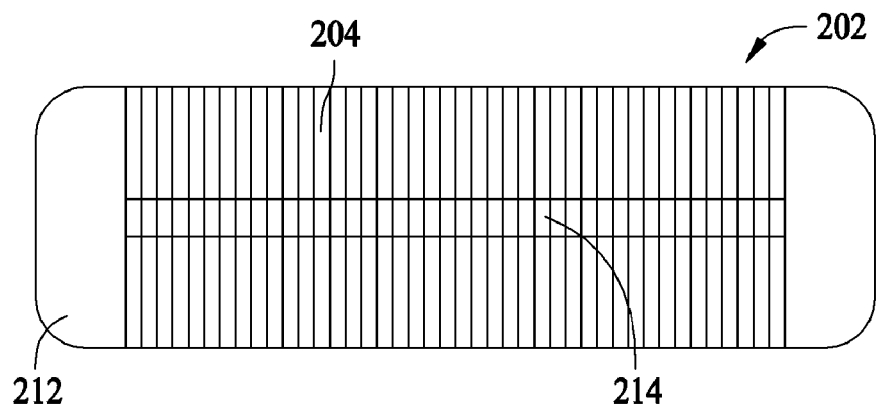
FIG. 4 is a front elevational view of the inductor assembly shown in FIG. 5 at a second stage of manufacture.
Figure 5:
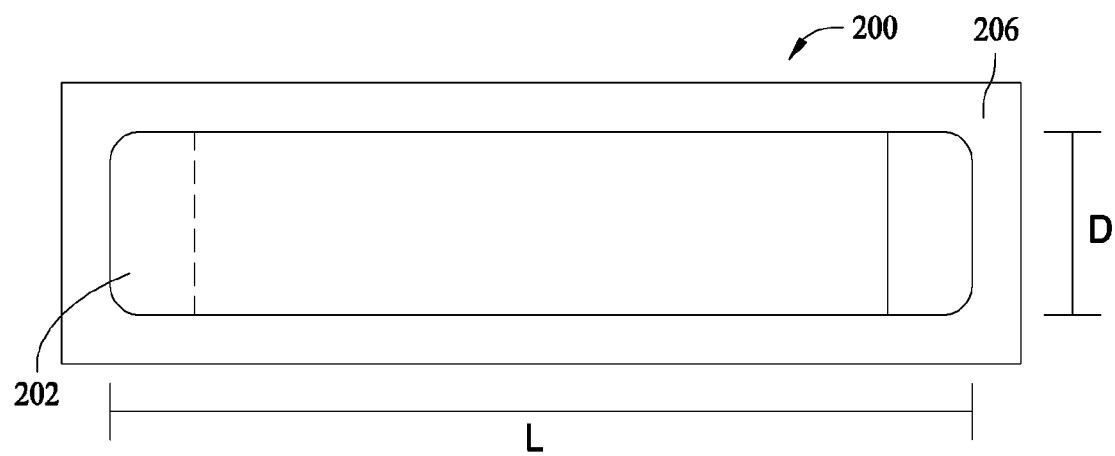
FIG. 5 is a front elevational view of the inductor assembly shown in FIG. 3 at a third stage of manufacture.
Figure 6:
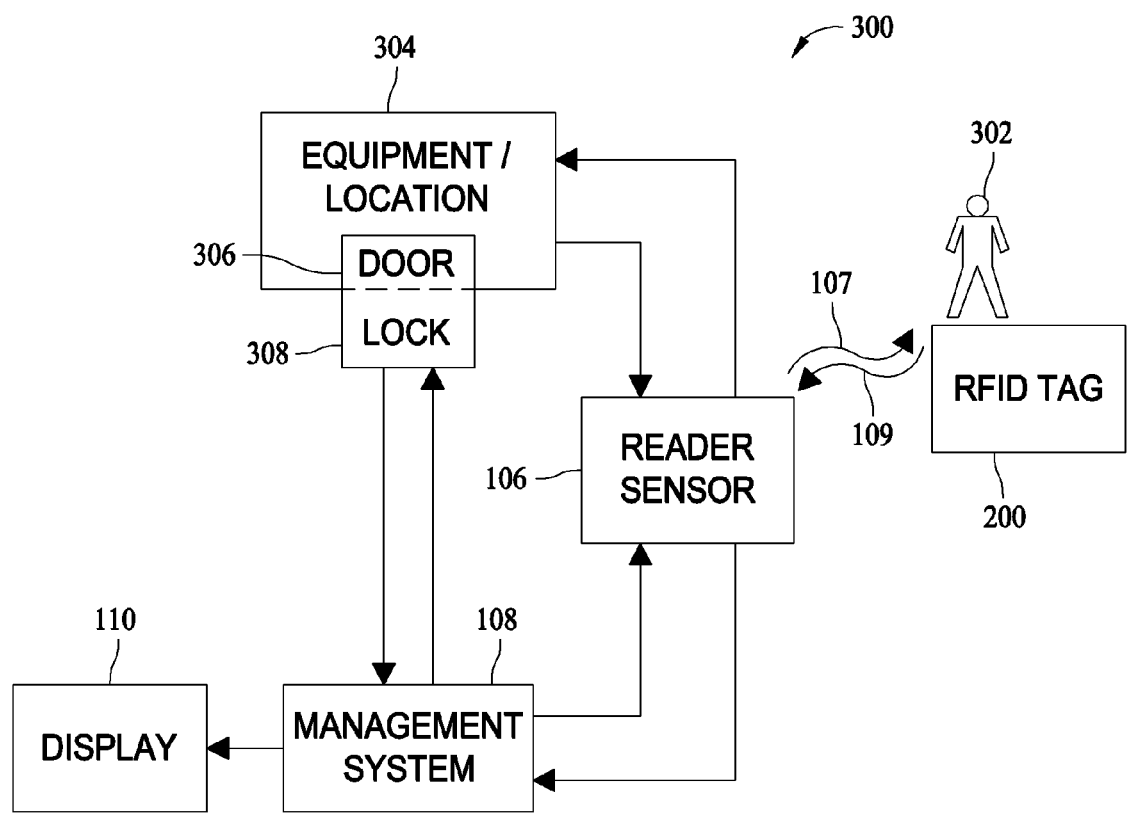
FIG. 6 is a schematic diagram of a system for the management of the use of protective gear potentially hazardous work environments.

Referring now to FIGS. 3-5, an inductor assembly 200 utilizes a magnetic core 202 (FIG. 3), a coil winding 204 (FIG. 4), and a protective element 206 (FIG. 5).

In an illustrative example, the inductor assembly 200 may be formed into a generally cylindrical shape with rounded ends reminiscent of medicine capsules and pills. The assembly 200 may have, as shown in FIG. 5 for example, an overall length L of about 20 mm or less, 15 mm or less, 12.5 mm or less, or 10 mm or less, and an overall diameter D of about 8 mm, 7 mm, 6 mm, 5 mm, 4 mm, 3 mm or less. Preferably, the assembly has an overall length of approximately 12.5 mm and an overall diameter of approximately 3.8 mm. With such a miniature or compact size, the inductor assembly 200 may attached, bonded, embedded, secured or otherwise coupled to personal protective equipment 102 without impacting the use, look, or feel of the equipment as it is worn. While exemplary dimensions are disclosed for the assembly 200, it is contemplated that the assembly 200 may be fabricated in different shapes and geometries having greater or lesser overall dimensions in alternative embodiments.

Referring now to FIG. 3, the core 202 may be fabricated from a magnetic media or material such as ferrite according to techniques known in the art, and more particularly from MnZn or NiZn ferrite in an exemplary embodiment. In one embodiment, the core 202 is formed into a bobbin or spool shape having opposed lateral flanges 212 defining disk-like cylinders of a first diameter $D_1$ and a central cylindrical axial portion 214 extending between the lateral flanges 212 and having a diameter $D_2$ that is less than $D_1$. The reduced diameter $D_2$ of the central portion 214 defines a winding space 216 between the lateral flanges 212.

In an illustrative embodiment, the central portion 214 is elongated and extends for a predetermined axial length or distance between the flanges 212. in cross section, as seen in FIG. 3, the core 202 is bilaterally symmetrical and resembles the shape of a capital I, and is sometimes referred to as a rod core or drum core. In an alternative embodiment, other shapes and geometries of the core 202 may be used in lieu of the bobbin core configuration shown in FIG. 3 as desired.

Referring now to FIG. 4, the coil 204 is wound over the core 202 and substantially fills the winding space 216 (FIG. 3) between the lateral flanges 212 of the core 202. The coil 204 may be a fine magnet wire having a conductor surrounded with enamel, polyurethane, polyimide, or polyester insulation and the like, for example, forming a flexible wire suitable for magnetic applications. The magnet wire may have, for example, a wire gauge of up to #50 AWG and the wire is wound on the core 202 for a number of turns utilizing known precision winding techniques with carefully controlled winding pitch, winding tension, diameter of wire, and the thermal coefficient of expansion of the wire material used, all of which avoids winding parasitics and achieves consistent and repeatable self-resonance frequencies when the coil 204 is excited with a predetermined input signal. Precision control of the winding process enables the inductor assembly 200 to consistently be excited at a very narrow bandwidth that permits accurate detection by the reader. In one embodiment, the coil 204 is formed in a manner that provides sufficient signal strength for reliable signal transmission and detection the assembly 200 within an operating distance of, for example, 12 to 18 inches away from a standard non-optical reader known in the art.

Referring now to FIG. 5, a protective element such as a winding wrapper 106 extends upon and substantially surrounds the coil 204 (FIGS. 4) on the core 202. The wrapper 206 forms a protective barrier around the coil 204 and maintains the wound coil 204 in place relative to the core 202. The wrapper 106 may be, for example, a polyester tape that is directly bonded or adhered to and in intimate contact with the outer surfaces of the coil 204 and the flanges 212 of the core 202.

It is contemplated that other protective elements, with or without bonding agents and adherents, may be employed in lieu of wrapping tape in alternative embodiments while accomplishing a similar effect. For example, protective sleeves may be provided such as a polyvinylchloride (PVC) or polymer based material into a hollow tube having an internal diameter dimensioned to extend over the coil 204 and exposed portions of the core 202. Encapsulants or coatings may likewise be utilized to protect the coil 204 and core 202 in use. Preferably, the encapsulants or coatings are sufficient to allow the personal protective equipment 102 to be washed a plurality of times without affecting the performance of the RFID tag.

Depending on the configuration of the coil 204 used to fabricate the assemblies 200, the frequency response of the assembly 200 may be varied. In one example, the assemblies 200, and specifically the coils 204 are constructed to produce a frequency response in the range of 500 to 600 mhz. Within this range, multiple frequency bands may be chosen to identify different levels and grades of personal protective equipment, with each of the coils 204 being designed to resonate within one of the frequency bands when exited by a reader. In one example, a number of different frequencies are chosen to represent each different levels of personal protective equipment, and each assembly 200 is constructed to exhibit a resonant frequency response that uniquely corresponds to one of the different levels. Each successive level of personal protective equipment may withstand, for example, a higher level of incident energy in an arc flash due to the thickness of fabric and material worn. Because each piece of personal protective equipment 102 includes one of the assemblies 200 with a frequency response corresponding to one of the different levels, the level of the protective equipment becomes self-identifying to the system.

In another embodiment, the REID sensor has a resonant frequency of less than 1 KHz, preferably between approximately 10 and 200 KHz, more preferably approximately 125 KHz. In another embodiment, the RFID sensor has a resonant frequency of greater than 125 KHz. In another embodiment, the REID sensor has a resonant frequency of between approximately 1 MHz and 1 GHz, preferably between approximately 10 and 100 MHz. In another embodiment, the RFID sensor has a resonant frequency of approximately 900 MHz. In another embodiment, the RFID sensor has a resonant frequency of greater than 1 GHz, preferably approximately 2.4 GHz. in one example, the RFID sensor may operate at a frequency of approximately 2.4 GHz, which may be particularly suited for the use of smaller antennas. In another example, the REID sensor may operate at a frequency of approximately 13.6 MHz. In another example, the RFID sensor may operate at a frequency of approximately 12 KHz, which may be particularly suited for use with large loop antennas. In another exemplary embodiment, the RFID sensor may operate a standard or global frequency, as defined a standards organization for REID applications.

While specific signal ranges have been described, and exemplary numbers of grades or levels of personal protection have been referenced above, it is understood that the inductor assemblies may be manufactured to provide resonant frequencies at still other frequencies, and that greater or fewer numbers of levels of personal protective equipment may be provided in other embodiments. Also, while specific types and items of personal protective equipment 102 have been described, it is understood that other items and other types of protective gear may be provided with the sensor tags 104 to obtain the significant benefits of the system as described, Specifically, personal protective equipment 102 directed to hazards other than arc flash may be addressed by the system substantially as described with the exception of the risk assessment analysis for each work site and task. Arc flash incidents are but one example of potential hazards that render personal protective equipment 102 advisable for workers.

In one embodiment, the present invention allows for personal protective equipment to be retrofit to include RFID tags which can be used with the RFID sensor of the present invention. For example, the RFID tags may be sewn, glued, or attached to the PPE by known means to ensure secure installation of the RFID tag. Preferably, the means of attachment are sufficient to ensure that the RFID tag cannot be easily removed and will remain in place after multiple washings or wearings.

Having now described the inductor assembly 200 defining the sensor tags 104 in detail, and basic operation and methodology of the system 100, implementation of the system to achieve specific objectives is believed to be a matter of programming that is within the level of ordinary skill in the art.

IV. SYSTEM AND METHOD ENHANCEMENTS

FIGS. 10-17 illustrate further systems and methods providing enhanced operation and numerous additional benefits for monitoring and ensuring a proper use of personal protective gear in light of potential hazards to persons, including but not limited to arc flash hazards when servicing energized electrical circuitry. While monitoring systems are described in the context of ensuring a proper use of personal protective equipment for potential hazards presented to a person while servicing energized electrical circuitry, similar benefits are believed to exist and could be used to address the use of protective gear for other types of hazards.

Figure 10:
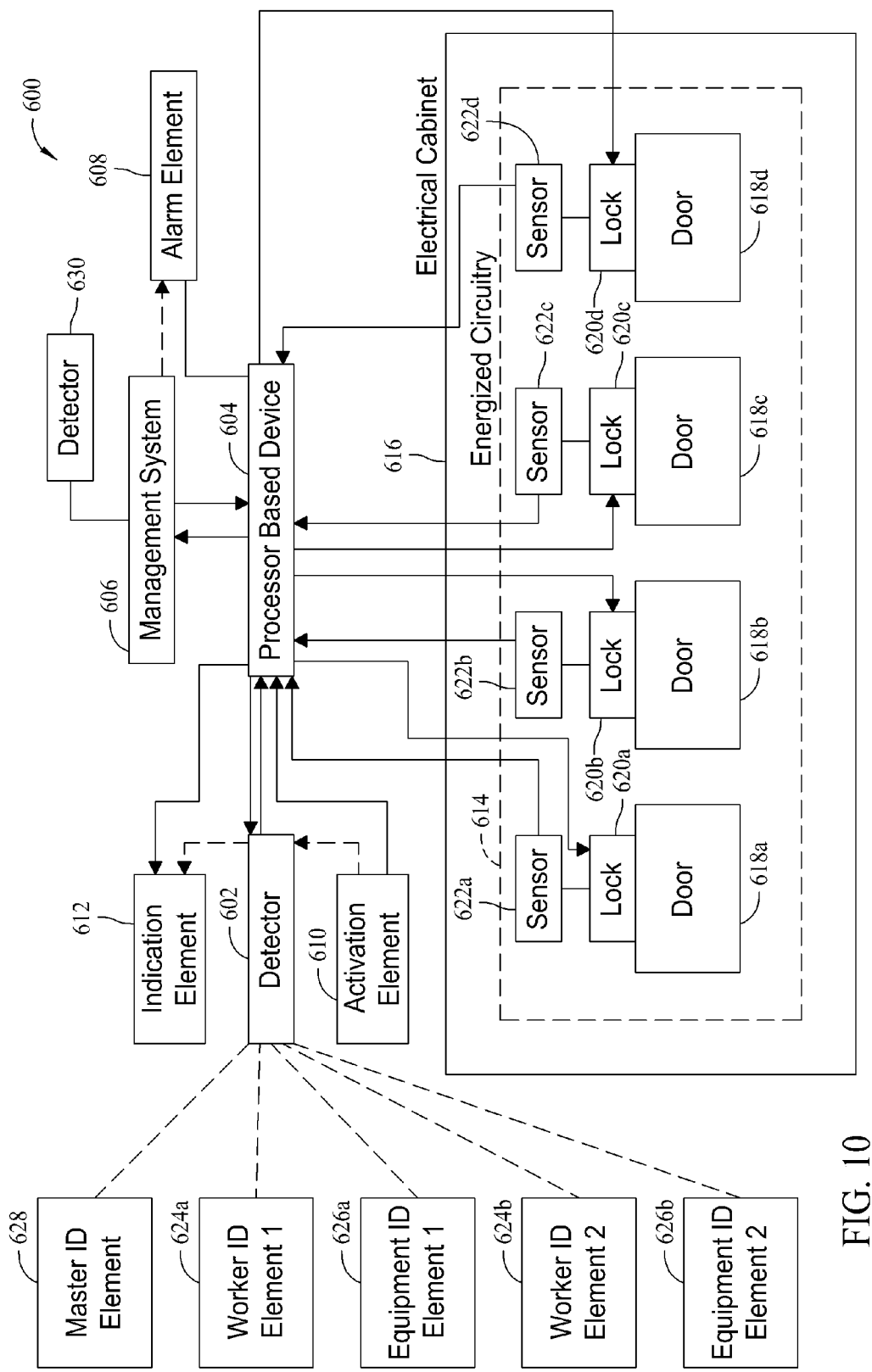
FIG. 10 schematically illustrates another system for monitoring the proper use of personal protective equipment in light of potential hazards to a person.

FIG. 10 schematically illustrates a system 600 for monitoring the proper use of personal protective equipment in light of potential hazards to a person. The system 600 electronically ensures the proper use of protective gear by appropriate persons attending to tasks presenting potentially hazardous conditions, and provides a degree of safety and security that largely, if not completely, avoids human error or confusion regarding recommended or personal protective equipment (PPE) for performing necessary tasks.

Like the foregoing embodiments, the monitoring system 600 includes a reader or detector 602, a processor-based device 604, and a management system 606 that may be remotely located from the detector 602 and/or the processor-based device 604. The detector 602 and the processor-based device 604 may be integrated into a single device serving the functions described herein, or may be separate devices communicating with one another. The processor-based 604 may transmit data corresponding to detected items of personal protective equipment, and other information described below, to a remote location where a management system 606 resides, or alternatively to another location as desired. The management system 606 in an exemplary embodiment may be a processor-based device such as a personal computer or notebook computer, and may serve as a data collector and reporting and analysis tool to ensure that proper PPE is being used by the appropriate persons, as well as providing access control and security information to potentially hazardous conditions, and even status of circuit protectors in an electrical power system.

In an exemplary embodiment, the processor-based device 604 wirelessly transmits data and information corresponding to detected items of personal protective equipment, among other things, to the remote location via a WiFi link or other mode of wireless communication. Alternatively, communication between the processor-based device may be established via a direct or indirect, hard wired connection such as an Ethernet connection or another Local Area Network (LAN), or a wide area network (WAN) connection. Communication between the processor-based device 604 and the management system 606 may also be accomplished via the Internet, for example, using a web-based protocol, or by other mediums and techniques familiar to those in the art.

An alarm element 608 is also provided and is operationally coupled to the processor-based device 604 and/or the management system 606. The alarm element 608 may be a known audio or visual device effective to summon the attention of nearby persons who may act accordingly in response to take appropriate safety, security, or other measures discussed below. The alarm element 608 may be local or remote from the processor-based device 604, and more than one alarm element may be provided.

As further shown in FIG. 10, the exemplary system 600 also includes an activation element 610 and an indication device 612. In the exemplary embodiment shown, the activation element 610 and the indication device 612 are coupled to the detector 602 and/or the processor-based device 604 and are located proximate to, or in the general vicinity of, the potential hazard. That is, the activation element 610, the indication device 612, and the detector 602 are each located nearby, or even coincident with, the precise location of an area presenting potentially hazardous conditions to persons.

In one embodiment, the potential hazard corresponds to energized electrical circuitry 614 that is generally contained in and surrounded by an electrical panel or cabinet 616, with portions of the circuitry 614 accessible by access doors 618a, 618b, 618c and 618d provided on the electrical cabinet 616. The detector 602 may accordingly be physically mounted to the cabinet 616, or otherwise situated proximate the cabinet 616 near one or more of the access doors 618a, 618b, 618c and 618d.

Each of the doors 618a, 618b, 618c and 618d may be hinged or otherwise positionable between opened and closed positions permitting or denying access to the energized circuitry 614. The doors 618a, 618b, 618c and 618d may be vertically and/or horizontally arranged on a face of the cabinet 616, and in an exemplary embodiment provide openings of a relatively small size that permit a worker's arms or hands to pass through to access the circuitry, but not the entire body of a worker. That is, in many contemplated embodiments, the worker stands generally outside of and in front of the electrical cabinet 616 and reaches through the doors 618 with his or her hands and arms to service portions of the circuitry 614 located behind the doors 618*a*, 618*b*, 618*c* and 618*d*. While four doors 618*a*, 618*b*, 618*c* and 618*d* are illustrated in FIG. 10, it is recognized that greater or fewer numbers of access doors 618*a*, 618*b*, 618*c* and 618*d* may alternatively be provided.

The portions of circuitry behind each door 618*a*, 618*b*, 618*c* and 618*d* and accessible through the openings associated with the doors 618*a*, 618*b*, 618*c* and 618*d* include one or more electrical components associated with the electrical power system. In exemplary embodiments, the electrical components may include circuit protectors such as breakers, switches, and fuses, or other electrical components that from time to time require service or maintenance, including but not limited to replacement. Additionally, it is understood that in an electrical power system, more than one panel or cabinet 616 may be present, with each cabinet provided with a separate monitoring system 600. Alternatively, more than one detector 602 and/or processor-based device may be supplied to monitor and detect activity with respect to each cabinet, or designated portions of a larger cabinet.

When the doors 618*a*, 618*b*, 618*c* and 618*d* are closed, the area adjacent and proximate to the electrical cabinet 616 is generally safe and presents minimal hazard to nearby persons. However, when the doors 618*a*, 618*b*, 618*c* and 618*d* are opened while the circuitry is energized, sometimes referred to as a "live" electrical system, portions of the energized circuitry are exposed in the area of the doors 618 and potential risks to nearby persons are presented, including arc flash incidents. To mitigate such hazards, personal protective equipment (PPE) is recommended and generally required by owners of the facilities wherein the electrical cabinet 616 is located. Unlike other types of hazards for which personal protective equipment is sometimes desired, and especially so for arc flash incidents, the PPE is worn in anticipation of a hazard that may occur sometime in the future, and not necessarily in light of a pre-existing hazard condition when a worker arrives at the scene. Alternatively stated, and unlike fire and chemical hazards which first responders don protective gear, there is no certainty that actual hazard conditions (such as arc flash incidents in the example illustrated) will materialize or occur when working on and around the circuitry 614 contained in the electrical cabinet 616.

Because potential hazard conditions are generally only presented when the doors 618*a*, 618*b*, 618*c* and 618*d* are opened, the doors 618*a*, 618*b*, 618*c* and 618*d* are provided with respective locking or latch mechanisms 620*a*, 620*b*, 620*c* and 620*d*, sometimes referred to as lockout devices. Each lock or latch mechanism is, in turn, provided with one or more door latch and/or position sensors 622*a*, 622*b*, 622*c*, and 622*d*. Suitable sensors, either for sensing a door latch/lock state or a door position (open or closed), and also locking mechanisms that may be remotely controlled are generally known and are not described in further detail herein. The doors 618*a*, 618*b*, 618*c* and 618*d* and their locking mechanisms 620*a*, 620*b*, 620*c* and 620*d* may be opened and operated independently or collectively by the processor-based device 604 and/or the management system 606 to lock or unlock the doors 618*a*, 618*b*, 618*c* and 618*d* as desired. Relatively large numbers of locks can practically be controlled by the processor-based device, such as 18-24 locks in an exemplary embodiment.

In an exemplary embodiment, the door sensors 622*a*, 622*b*, 622*c*, and 622*d* provide input signals to the processor-based device 604 regarding for example, whether one or more of the doors 618*a*, 618*b*, 618*c* and 618*d* is latched or unlatched, or whether the doors 618*a*, 618*b*, 618*c* and 618*d* are opened or closed. In turn, the processor-based device 604 may provide input signals to the locking mechanisms 620*a*, 620*b*, 620*c* and 620*d* that cause them to lock or unlock as desired to provide security and enhanced safety features. As described below, the processor-based device may be configured to unlock the locking mechanisms 620*a*, 620*b*, 620*c* and 620*d* only when pre-approved workers having the adequate PPE is present at the location of the electrical cabinet 616 and circuitry 614, as detected by the detector 602, while locking the doors 618*a*, 618*b*, 618*c* and 618*d* in all other circumstances. Additionally, the processor-based device 604 may activate the alarm element 608 to provide a local and or remote alarm that one or more of the doors 618*a*, 618*b*, 618*c* and 618*d* is opened or unlatched when it should be closed and locked. Alternatively, the alarm element 608 may be activated when the doors 618*a*, 618*b*, 618*c* and 618*d* are locked when they otherwise should be opened to indicate an error condition. Latching or unlatching of the door locks may also be logged and recorded by the processor-based device 604 as locking and unlocking events occur.

The detector 602 is configured to communicate with one or more worker identification elements 624*a* and 624*b* and one or more equipment identification elements 626*a* and 626*b*. While two worker identification elements 624 and two equipment identification elements 626 are illustrated in FIG. 10, it is contemplated that that any number of elements 624 and 626, including one, could likewise communicate with the detector 602 in use. Various types of detectors 602 are contemplated, including an RFID reader or interrogator, a magnetic card reader, a bar code scanner, an X-ray scanner, or another known and established technology in which the worker and equipment identification elements 624 and 626, respectively, may communicate with or otherwise be identified by the detector 602. The detector 602 in an exemplary embodiment is physically proximate the electrical cabinet 616 such that it may communicate with worker identification elements 624 and equipment identification elements 626 when the workers are standing in front of or alongside the cabinet 616 in one example.

The detector 602, by virtue of the worker identification elements 624 and the equipment identification elements 626, may sense, detect, or otherwise deduce the presence of multiple persons and multiple items of PPE at the same time. Further, based on detected characteristics of the worker identification elements 624 and equipment identification elements 626, which may be frequency response characteristics described above or other detectable characteristics, the processor-based device 604 may identify specific workers, types and grades of items of PPE, or even uniquely identify items of PPE. Each of the worker identification elements 624 uniquely corresponds to a particular person such as a technician responsible for maintaining an electrical system, and each of the equipment identification elements 626 corresponds to an item of PPE. As such, the system 600 is fully capably of identifying individual workers as well as the PPE types and/or grades that each individual worker possesses. In combination, the identity of the individuals present at the cabinet 616 and proximate the circuitry 614, and also the items of PPE that they possess, allow the system to determine whether or not the doors 618*a*, 618*b*, 618*c* and 618*d* will be unlocked by the processor-based device 604 to provide worker access to the circuitry 614.

The worker identification elements 624 allow the system 600 to function from both a security perspective and a worker training perspective. In embodiments contemplated, numerous persons would be given a worker identification element 624, but only after each person has sufficient experience with and completed training in the proper use of the PPE items for particular service procedures to be performed on the live electrical circuitry, and also completed training on using the system 600 itself. Different degrees of training and experience are expected to be accounted for in the worker identification elements 624 provided to each individual worker, with some workers being pre-approved or authorized to perform certain tasks while other workers are not.

In an environment where all workers posses a worker identification element, the system 600 can effectively identify all persons at risk in the vicinity of the circuitry 614 and determine whether they possess sufficient training and experience to assume it. Such a determination could be made using a lookup table stored in the system memory, wherein workers may be specifically identified and recognized by the system to compare them with any authorization criteria (training, experience, title, etc.). In another embodiment, the system may recognize grades or levels of worker identification elements 624 (e.g., Level 1, Level 2, and Level 3 representing different grades of training or experience) but not identify the specific workers themselves.

When the worker identification elements 624 are detected by the detector 602, the system may identify and distinguish multiple workers present at the site of the cabinet 616, and determine whether or not the persons present are authorized to proceed with the necessary service or maintenance procedures for the circuitry 614. If un-authorized persons are presented, the doors 618a, 618b, 618c and 618d will not be unlocked and the circuitry 614 may not be accessed. Additionally, worker identification detection events may be logged and stored by the system 600, in either or each of the processor-based device 604 and the management system 606 for record keeping purposes, and the logged and stored information may serve as future training tools and analysis tools regarding operation of the electrical system and the monitoring system 600. Various types of worker identification elements 624 are contemplated, including by not limited to RFID tags such as those described above, or other technology such as, for example only, smart cards, magnetic cards that may be read by the detector, bar coded elements, and elements adapted to be detected via x-ray scanning or other techniques. The worker identification element 624 may be integrated into an identification badge or other item normally carried by a person to ensure its presence with the worker, or integrated into an item of PPE or other item that would be brought the site of the circuitry 614 for detection by the system 600.

As previously explained, eligible items of PPE may include a hard hat, a face shield, a flame resistant neck protector, an ear protector, a protective suit, an insulated rubber glove, an insulated piece of footwear, and an insulated tool to be used by a person. The PPE items may, as discussed above, be adapted to provide protection to the person in the event of an arc flash incident occurring while the person is servicing the energized electrical circuitry 614, or to address other concerns or other types of hazards. Each of these items, or additional items in further embodiments, may be provided with its own equipment identification element 626, or as described above, only representative items may be provided with an equipment identification element 626. Multiple items of PPE belonging to different workers may be more or less simultaneously detected by the system 600. Equipment identification elements 626 may be coupled to items of PPE in any manner desired, including stitching or sewing, adhesive labels and the like, or with clips, ties, fasteners and other known techniques. Various types of equipment identification elements 626 are contemplated, including by not limited to RFID tags such as those described above, or other technology such as, for example, smart cards, magnetic cards that may be read by the detector, bar coded elements, and elements adapted to be detected via x-ray scanning.

As also shown in FIG. 10, at least one master identification element 628 is also provided. The master identification element 628, when detected by the detector 606 generally suspends operation of the system 600 and causes all the access doors 618a, 618b, 618c and 618d to be unlocked immediately. That is, when the master identification element 628 is detected by the detector 602, the lockout devices 620a, 620b, 620c, 620d may be operated such that the doors 618a, 618b, 618c and 618d may be opened without first determining, as the system 600 ordinarily would, whether or not authorized personnel and appropriate personal protective equipment is present. Because the master identification element 628 operates in such a manner to bypass all the protections of the system 600, it is contemplated that few master identification elements 628 will be issued and will only be accessible to high level personnel. It is also anticipated that the master identification elements 628 would only be used in emergency situations wherein the system 600 would frustrate or impede completion of emergency actions and procedures. Various types of master identification elements 628 are contemplated, including but not limited to RFID tags such as those described above, or other technology such as, for example, smart cards, magnetic cards that may be read by the detector, bar coded elements, and elements adapted to be detected via x-ray scanning. The master identification elements 628 in some embodiments could be considered a particular type of a worker identification element 624, and thus could also be integrated into a name badge or other item likely to be carried by a worker to the site of the circuitry 614.

It is recognized that different combinations and types of worker identification elements 624, equipment identification elements 626 and master identification elements 628 may be simultaneously employed. For example, a worker identification element 624 may be a magnetic card having embedded information, the equipment identification elements 626 may be RFID tags as described above, and the master identification element 628 could be another type of element. Such a system having different types of identification elements 624, 626, 628 would entail more than detector 602 for each type of identification element and would thus presumably be more expensive and more complicated to install, maintain and operate. In perhaps a simpler and lower cost embodiments, all of the worker, equipment and master identification elements would be the same type, such as RFID sensor tags described above and would all communicate with the same detector 602, or at least detectors of the same type.

In practice, a relatively large number of equipment identification elements 626 and worker identification elements 624 may be provided, and a relatively large number of workers may be asked or required to respond to certain situations. As such, the system 100 may recognize different individuals, and associate the individuals with items of PPE having at least one of the equipment identification elements. The detector 602 may be configured to, based on detected characteristics of the worker identification elements 624 and the equipment identification elements 626, identify all of the individuals present at the portion of the energized electrical circuitry 614 and the PPE associated with each of the identified individuals. The processor-based device 604, in response to signals from the detector 602, also determines whether or not the identified individuals are authorized users of the system 600 and whether or not they have adequate items of PPE to proceed to access the circuitry 614.

The activation element 610 may be located proximate the detector 602 and a portion of the energized electrical circuitry 614. The activation element 610 may be, for example, an input selector such as a pushbutton or other switch (including touch sensitive technologies), a lever, a toggle switch, a keypad, a smart card, a magnetic card, or other input element that one of the workers present must manipulate to start the operation of the system 600. In the case of a pushbutton, this is sometimes referred to as a push-to-start system wherein the detector 602 communicates with any of the above-described identification elements 626, 626, 628 in the vicinity of the cabinet 616 only after the activation element 610 is manipulated by a person. The activation element 610 may be mounted to the electrical cabinet 616 containing the energized electrical circuitry 614, and the processor-based device 604 may be configured to log and save occurrences wherein the activation element 610 is manipulated and the appropriate personal protective equipment is not determined by the system 600, or wherein unauthorized persons are detected. The push-to-start or manual operation of the system 600 enables power savings by only operating the detector 602 on demand, as well as a degree of user friendliness by operating only when the worker(s) are ready to be evaluated by the system 600. That is, the system 600 will not prematurely scan the workers before they are fully prepared, and workers will not be caught off guard by the system 600.

When the activation element 610 is manipulated to start system operation, the detector 602 operates to communicate with any of the worker identification elements 624, the equipment identification elements 626 and master identification elements 626 present. The processor-based device 602, in response to detected characteristics of the identification elements present, determines whether the workers identified by the worker identification elements 624 are authorized to proceed, and whether the PPE items identified are appropriate in light of, for example, a potential arc flash energy intensity corresponding to the portion of the energized electrical circuitry 614 to be serviced.

The detector 602 may be mounted to the electrical cabinet 616 containing the energized electrical circuitry 614, and when operated scans the immediate vicinity around the cabinet 616 and detects all workers and their items of PPE more or less simultaneously. The indication device 612 is also located proximate the energized electrical circuitry 614 in an exemplary embodiment, with the indication device 612 identifying to a user whether the appropriate PPE items have been detected for each worker. The indication device 612 may also provide confirmation to the individuals regarding the number of individuals present at the cabinet 616 containing portions of the energized electrical circuitry 614. Still further, the indication device 612 may be located proximate the portion of the energized electrical circuitry 614 and may provide feedback to the identified individuals (i.e., detected workers) whether the individuals identified are authorized and whether the appropriate personal protective equipment is detected.

In some embodiments, certain of the features described above may be considered optional. For example, door lock sensors and locking mechanisms may be omitted in some installations, with door position being sensed instead. As another example, the manual activation element 610 may be omitted and the system may be activated in other alternative ways. For example, in an embodiment wherein door locks are not provided, opening of one or more of the access doors may be detected with the position sensors 622, triggering the system to activate and operate the detector 602 to evaluate persons and PPE in the vicinity whenever a door is opened. Further, nearby persons and PPE could be automatically detected by the system 600 if desired, before any access door is opened. For example, the system 600 may continuously run and scan the immediate area at all times such that the detector 602 would identify any identification elements 624, 626, 628 in the vicinity of the detector whenever they are presented in the space covered by the system 600. Alternatively, the system could include proximity sensors, motion detectors, or other technologies that would cause the system to automatically "wake up" and perform detection when persons and equipment are in the area, but otherwise dwell or sleep in a lower power mode when no workers are present in the vicinity. It is understood that these different types of activation are not necessarily mutually exclusive to one another, and they may be utilized separately and/or in combination to provide degrees of redundancy and flexibility to customize the system 600 for different end users.

An additional detector 630 may be provided at a location remote from the detector 602, and may serve as a remote programming tool for initializing the system with identification elements 624, 626 and 628. The elements 624, 626 and 628 may be scanned at the remote location using the detector 630 as system inputs, without having to bring the elements 624, 626, 628 to the electrical cabinet 616 where the detector 602 is located. Thus, in one example, newly issued identification elements 624, 626, 628 could be scanned where the PPE is stored or at another convenient location and later recognized by the system 600 when brought the detector 602 at the electrical cabinet 616.

Figure 11:
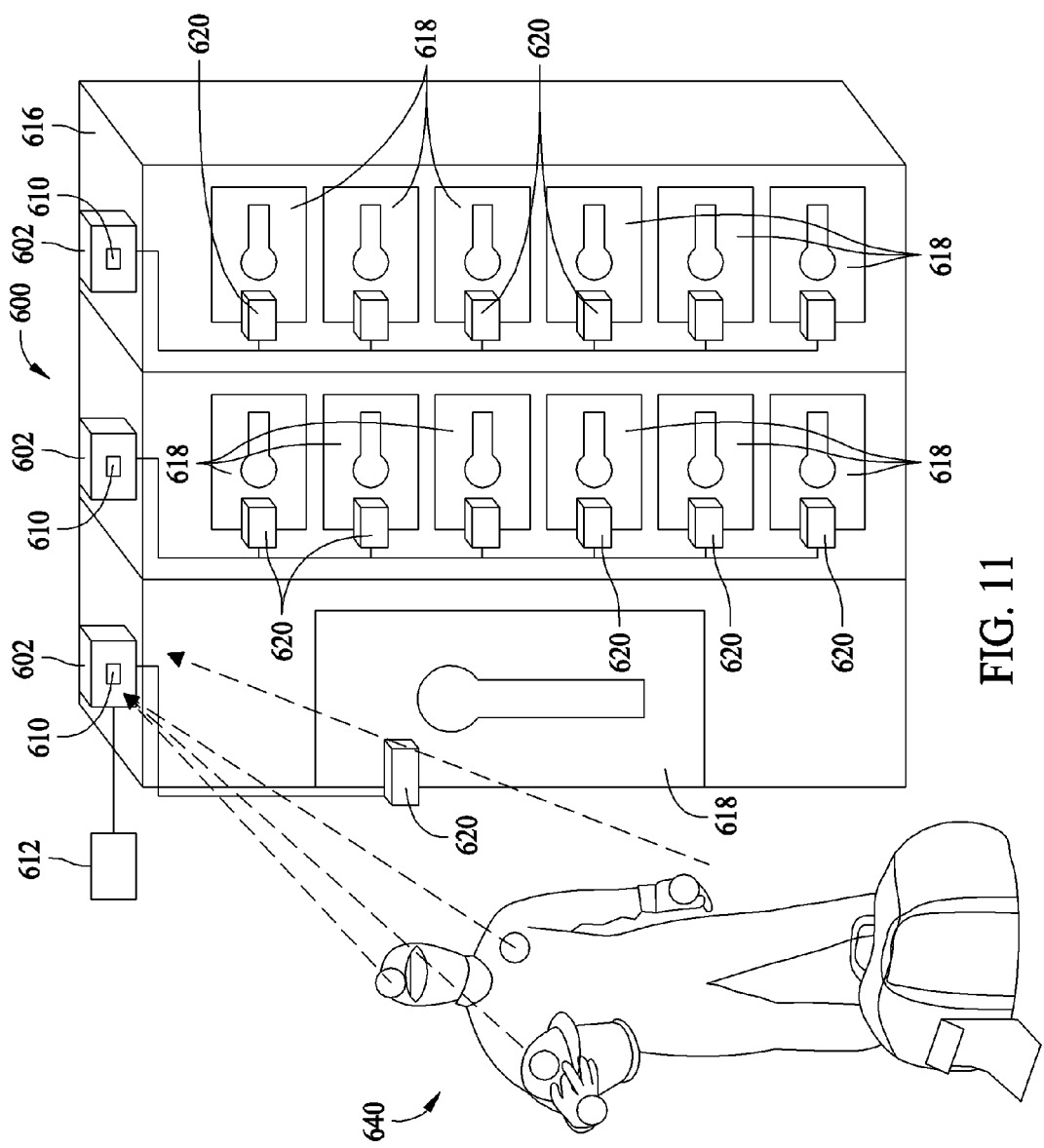
FIG. 11 illustrates a perspective view of the system shown in FIG. 10.

FIG. 11 illustrates a portion of the system 600 in an exemplary installation. The cabinet 616 is provided in multiple sections each having multiple access doors 618 and door locking mechanisms 620 associated with each door. A plurality of detectors 602 are provided on the different sections of the cabinet 616, and each detector 602 includes an activation element 610. In the embodiment illustrated in FIG. 11, the detectors 602 are mounted to the cabinet 616 at a top edge thereof, and the activation element 610 is integrated into the housing of each detector 602. The processor-based device 604 (FIG. 10) may also be integrated into the same housing as the detector 602, or may be separately provided and located elsewhere in other embodiments.

When a worker 640 arrives at the cabinet 616, the worker presses or otherwise manipulates one of the activation elements 610, causing the respective detector 602 to operate and detect, scan, or otherwise read the identification elements 624 and 626 (FIG. 10) for the worker and the PPE worn by the worker 640, or a master identification element 628 (FIG. 10) if the worker 640 happens to possess one. If the system 600 determines that the worker 640 is authorized and has the correct PPE items, based on detected characteristics of the identification elements, the door locking mechanisms are unlocked. To make such determinations, lookup tables and the like may be consulted by the processor-based device 604 (FIG. 10), such as those described below. Multiple workers may be assessed at the same time in a single scan, or in succession with repeated manipulation of an activation element 610.

An exemplary circumstance/outcome table, sometimes referred to as a truth table, may be consulted for the system to take appropriate actions and is set forth below in Table 1. As will be seen from Table 1, the result or outcome of system operation depends on whether the activation element was manipulated, whether the correct PPE is worn, whether one or more of the doors are opened by a worker, and whether the PPE was read correctly by the system.

For purposes of Table 1, correct PPE is "worn" by the worker when PPE has equipment identification elements recognizable by the system and the PPE is of the correct type or grade. PPE items not recognizable by the system or that correspond to the wrong type or grade of PPE for a given task are not correctly worn or selected by the worker.

Also for purposes of Table 1, PPE is read correctly when it is actually detected by the system and determined to be of the correct type and/or grade for a given task. It is possible that a worker may have worn the correct PPE, but the system was not able to read it due to the relative locations of the PPE items and the reader, or when workers inadvertently blocks detection of certain items by holding them behind their backs, for example. If PPE is present but not correctly read, the worker(s) may try again to have it scanned and read, and may adjust their position if necessary to obtain a passing scan.

TABLE 1

Circumstance/Outcome

| Activation Element Manipulated? | Correct PPE Worn? | Door Opened? | PPE Read Correctly? | Result |
|---|---|---|---|---|
| No | No | No | No | No Action |
| No | No | Yes | No | Fail, Activate Alarm and Log Event |
| No | Yes | No | No | No Action |
| No | Yes | No | Yes | No Action |
| No | Yes | Yes | No | Fail, Activate Alarm and Log Event |
| No | Yes | Yes | Yes | Pass, Log Event |
| Yes | No | No | No | Fail, Activate Alarm and Log Event |
| Yes | No | Yes | No | Fail, Activate Alarm and Log Event |
| Yes | Yes | No | No | Fail, Activate Alarm and Log Event |
| Yes | Yes | No | Yes | Pass, Log Event |
| Yes | Yes | Yes | No | Fail, Activate Alarm and Log Event |
| Yes | Yes | Yes | Yes | Pass, Log Event |

Table 1 is generally applicable to various possibilities and variations of the system with appropriate modification. For example, in an automatically activated system without a manual activation element, the yes and no condition in the first column in Table 1 may correspond to automatic activation events or lack thereof. As previously mentioned, in some embodiments, a sensed opening of a door may trigger the detector to operate, and hence it may be possible, as Table 1 indicates, for a Pass result to occur even when the activation element is not manipulated. Therefore, in an example wherein locks for the access doors are not provided, scanning could be commenced either with manipulation of the activation element or by opening of the door by the worker.

It is also noted that the pertinent table circumstance for the doors set forth in Table 1 is whether they are opened, not whether they are unlocked or unlatched. Automatic unlocking or unlatching of the doors by the system is not necessarily precluded by Table 1, but neither is it required. In an embodiment including automatic locking features for the doors, the doors would by unlocked by the system when Pass results are obtained, and otherwise locked. Whether or not door locks are present, as Table 1 indicates, instances where the access doors are found to be opened without satisfying worker and PPE requirements result in error conditions and alarms.

One or more indication devices 612, exemplary embodiments of which are described below, may also be provided in the system 600 for feedback and informational purposes to the worker 640 regarding the outcome of the worker and PPE evaluation by the system 600. As will become clear, the indication device 612 may indicate a pass/fail outcome to the worker, as well as convey deficiencies to the worker 640 regarding why a pass outcome was not obtained. The indication devices 612 may be integrated into the housing of the detector 602 or may be separately provided from the detector 602 and located elsewhere if desired.

Figure 12:
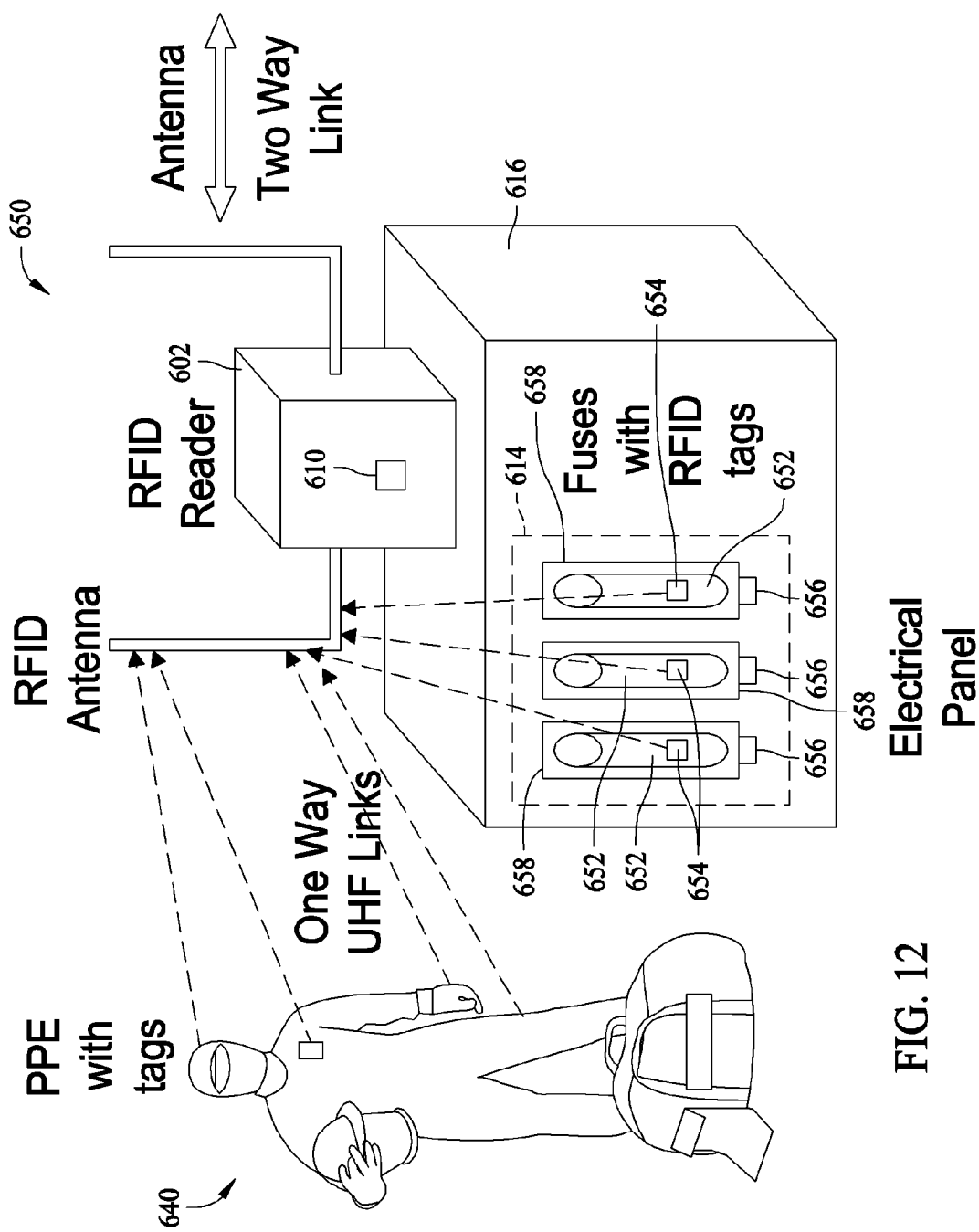
FIG. 12 illustrates an alternative system to that shown in FIG. 11.

FIG. 12 illustrates an alternative system 650 to system 600 (FIGS. 10 and 11). The system 650 includes the features described for the system 600 (FIGS. 10 and 11) but includes additional state detection for portions of the circuitry 614 in the electrical panel or cabinet 616.

In the embodiment shown, the circuitry 614 includes one or more circuit protectors 652 each provided with a state indicator element 654. The detector 602, in addition to detecting authorized workers and items of PPE, also detects an operating state of the circuit protectors 652. For example, the circuit protectors 652 may be overcurrent protection fuses completing circuit paths through the circuitry 614 in normal operation, but opening the circuit paths upon an occurrence of an overcurrent event that causes the circuit path through one or more of the fuses to fail. In the normal state or condition, the circuit path through the fuse is conductive and carries electrical current through the fuse. When one or more of the fuses operates, the current path through the fuse is opened and no current can be carried through the fuse, causing an interruption of current to one or more portions of the circuitry 614 associated with the opened fuse. The state indicator elements 654, which can also be read or detected by the detector 602 can be used to determine whether or not each fuse is in an operative, current carrying state or an opened, non-current carrying state interrupting a portion of the circuitry. In one exemplary embodiment, the indicator elements 654 may be RFID sensor tags such as those described in commonly owned U.S. Pat. No. 7,369,029 (including methodology for determining fuse states) and U.S. Published Patent Application No. 2008/0231410, the disclosures of which are hereby incorporated by reference in their entirety. In another embodiment, other fuse sensing and detection technology may be utilized.

Still further, and as shown in FIG. 12, the system 650 includes detectable elements 656 that may be sensed, read or scanned by the detector 602. Each of the elements 656 corresponds to a connecting holder 658 that receives and establishes electrical connection between one of the electrical components 652 and the circuitry 614. In the case of overcurrent protection fuses, the connecting holders 658 may be fuse holders familiar to those in the art. The detectable element 656 may be any of the types discussed above for the identification elements 624, 626 and 628. By correlating indication elements 654 with the detectable elements 656, the system 650 may determine a presence or absence of the circuit protectors 652 in the electrical panel. As such, the system 650 is capable of distinguishing between different types of circuit interruption events, such as when an existing fuse has operated to interrupt a portion of the circuitry 614 or when a fuse has been removed but not replaced. Different types of alarms could be presented to workers in either case. Additionally, the system 650, by virtue of the detectable elements 656 and the state elements 654, can identify mismatched circuit protector and holder combinations (e.g., fuses having voltage ratings that exceed the holder voltage ratings) or even improperly installed circuit protectors.

Figure 13:
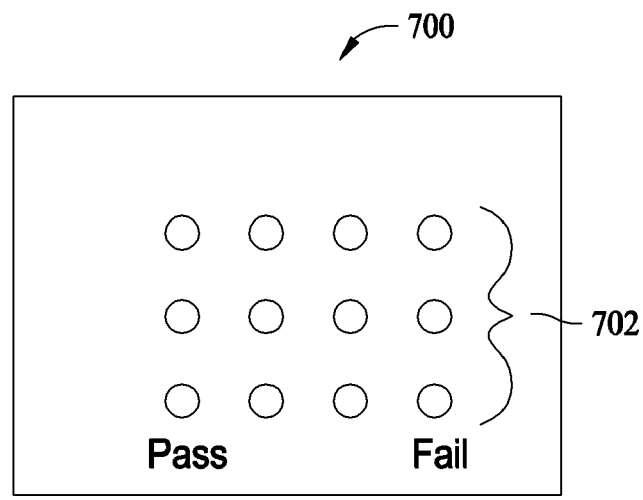
FIG. 13 is a first representation of an indication device for the systems shown in FIGS. 10-12.

FIG. 13 is a first representation of an exemplary embodiment of an indication device 700 for the systems shown in FIGS. 10-12. The indication device 700 may include a plurality of indicators such as lights 702 arranged in an array of columns or rows. Each row may correspond to a detected worker by the system, and each column may correspond to an item of PPE, and the rows and columns collectively indicate whether a detected worker is authorized or whether specific items of PPE have been detected. Illumination of the lights may indicate to a worker or workers whether the operation of the detector has resulted in a pass or fail outcome. In an alternative embodiment having fewer lights 702, the lights could be flashed, for example, or otherwise patterned to indicate the number of workers detected and the number of items of PPE detected, but not necessarily which ones. That is, the indication device 700 may provide information beyond pass/fail considerations, such as confirmation of the number of workers scanned or the number of items scanned, either generally or specifically depending on the sophistication desired.

In a further embodiment, one or more of the lights 702 may be displayed in one of at least two colors, such as red and green. The respective colors may be lit to indicate the presence or absence of authorized workers and/or the appropriate personal protective equipment. When given the green light, the worker(s) may proceed. When shown a red light, the worker(s) must stop and make appropriate corrections, or try again. The lights 702 may be light emitting diodes of different colors. The lights 702 may be flashed, blinked or otherwise pattern to indicate various alarm conditions to a user.

An exemplary outcome table or truth table is set forth below setting forth exemplary scenarios regarding indication provided to workers and responses of the system in operation.

TABLE 2

Circumstance/State Response

| Workers Present? | PPE Detected? | Worker Indication Color | PPE Indication Color | Door State | Alarm State |
|---|---|---|---|---|---|
| All authorized | All proper items detected | Green | Green | Unlocked | No |
| All authorized | Some items not detected | Green | Red | Locked | Yes |
| All authorized | No items detected | Green | Red | Locked | Yes |
| Some persons authorized | Proper items detected, but in greater number than necessary | Green | Red | Locked | Yes |
| Some persons authorized | Proper items detected in the right number | Green | Green | Unlocked | No |
| Some persons authorized | Items not detected | Green | Red | Locked | Yes |
| No authorized person | n/a | Red | No Indication | Locked | Yes |

It is evident from Table 2 that in some embodiments the system evaluates the type or grade of PPE (i.e., quality) and also the number of items of PPE (i.e., the quantity) to make determinations. For example, if two authorized persons are detected but more than two sets of PPE are detected, it may be inferred that there is another person present not recognized by the system, resulting in the doors staying locked and an alarm being set.

Additional embodiments are contemplated that, unlike the scenarios of Table 2, may allow the doors to be opened provided at least one person is present that is authorized. In such a situation the authorized person may be a supervisor or team leader that assumes responsibility for other persons present.

Also, exceptions may be made for training or inspection purposes, or for other reasons, wherein a person is not designated as authorized but is accompanied by another person who is authorized. Trainees or invited guests could be identified with special worker identification elements recognized by the system, and in such a case would be generally unauthorized to proceed on their own but would not trigger an alarm or a lockout conditions so long as predetermined authorized persons accompany them. Lookup tables and the like may be consulted to determine such exceptions on a case-by-case basis.

Figure 14:
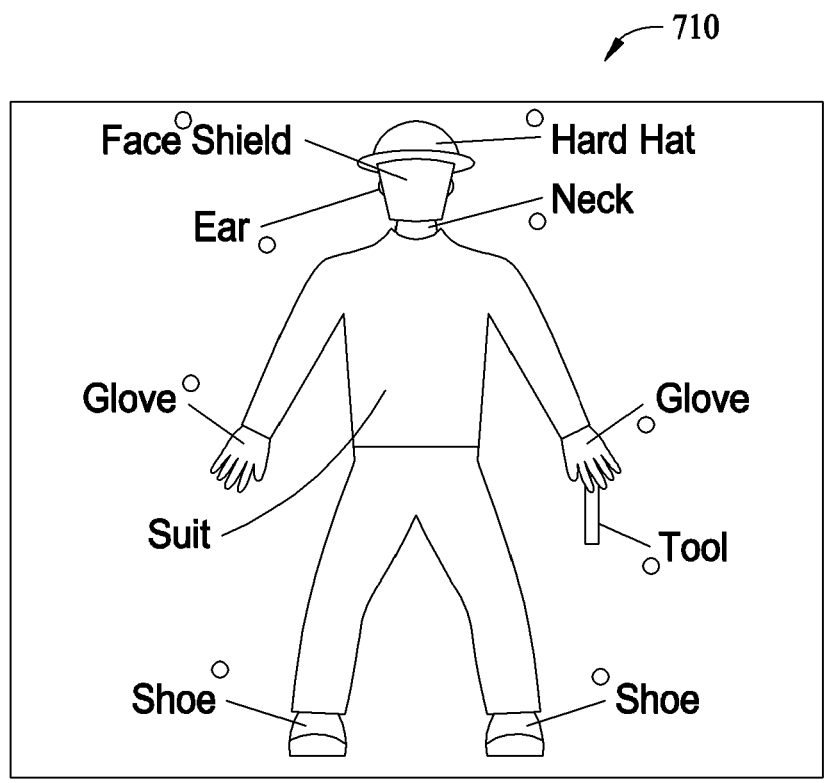
FIG. 14 is a second representation of an indication device for the systems shown in FIGS. 10-12.

FIG. 14 is a second representation of an exemplary indication device 710 for the systems shown in FIGS. 10-12. The indication device 710 includes a representation of a human person and associated items of personal protective gear. As such, the worker(s) may see specifically the items of the PPE that the system is attempting to detect, and may highlight to workers, using a light or other technique, which of the PPE items has been detected or not detected. Additional lights or indicators could be included to identify the number of persons scanned, and the representation of the human person in the indication element 710 could be sequentially displayed for each worker detected. By providing specific information to the worker(s) any deficiencies or missing items could more easily be corrected by the workers to obtain a pass outcome and be given access to the circuitry.

Figure 15:
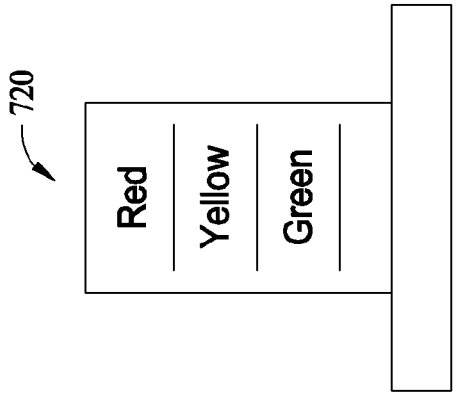
FIG. 15 is a third representation of an indication device for the systems shown in FIGS. 10-12.

FIG. 15 is a third representation of an indication device 720 for the systems shown in FIGS. 10-12. The indication device 720 is provided in the form of a stand alone beacon having sections of different colors (e.g., red, yellow, and green). The red section is illuminated when workers are determined to be unauthorized or when the proper PPE is not detected. The yellow section is illuminated, for example, when adequate but not ideal PPE is detected, thereby indicating that workers may proceed with caution. The green section is illuminated when authorized workers are detected having the recommended PPE.

The indication devices 700, 710 and 720 are but a few examples of visual feedback elements that may be provided for workers to gain some insight into detected circumstances by the systems. As previously described, the system could be provided with an electronic display screen 110 (FIG. 1) with similar indication features being presented on the display. It is recognized that other visual indication elements not described may also be provided with similar function and result, that combinations of the described indication devices 700, 710 and 720 and other indication elements may be utilized in various situations. Further, such indication devices 700, 710 and 720 may be utilized in system embodiments without lockable access doors for electrical panels, on the understanding that workers would give due heed and caution to the feedback or warnings provided by the indication elements before proceeding to access energized electrical circuitry.

Audio indicators may also be utilized, whether or not in combination with the visual indication devices described. For example, different sounds or tones may be generated to indicate pass or fail conditions. Short beeps or other tones may confirm the number of persons detected. Many variations of such audio and visual indication are possible to meet the needs of different users.

Figure 16:
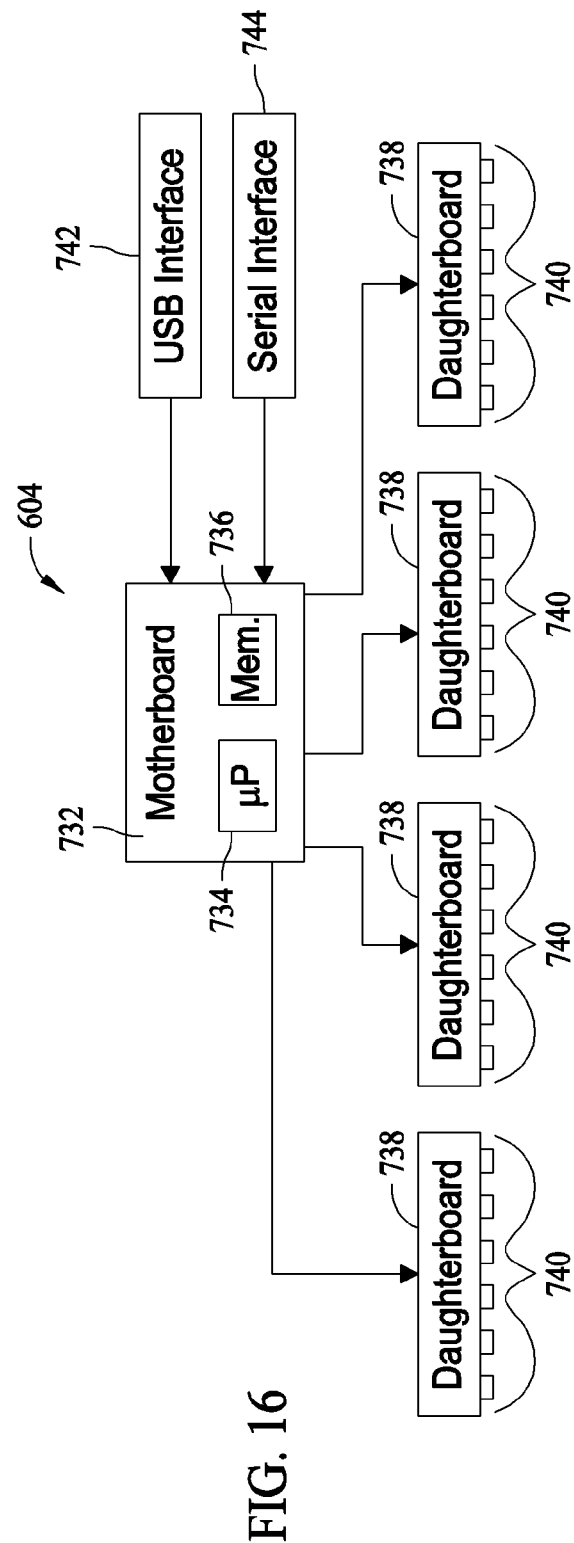
FIG. 16 is a schematic diagram of an exemplary processor-based device for the systems shown in FIGS. 10-12.

FIG. 16 is a schematic diagram of an exemplary processor-based device 604 for the systems shown in FIGS. 10-12. The device 604 is modular and includes a motherboard 732 having a microprocessor 734 and a memory 736, any number of daughterboards 738 including a number of standard input/output connectors 740 (e.g. six connectors per daughterboard), and multiple interface options including a USB interface 742 or a serial port interface 744 or other interface options to communication with a remote management system or other device. Devices 604 may be constructed using these and other pieces to provide end users with any desired number of connection options and interfaces to suit a wide variety of needs for different electrical systems and for different users. Once assembled, addressing schemes may be executed on the motherboard 732 to communicate properly with the various elements of the systems 600 and 650 (e.g., latch sensors, locking mechanisms, indication elements, alarm elements etc.).

Figure 17:
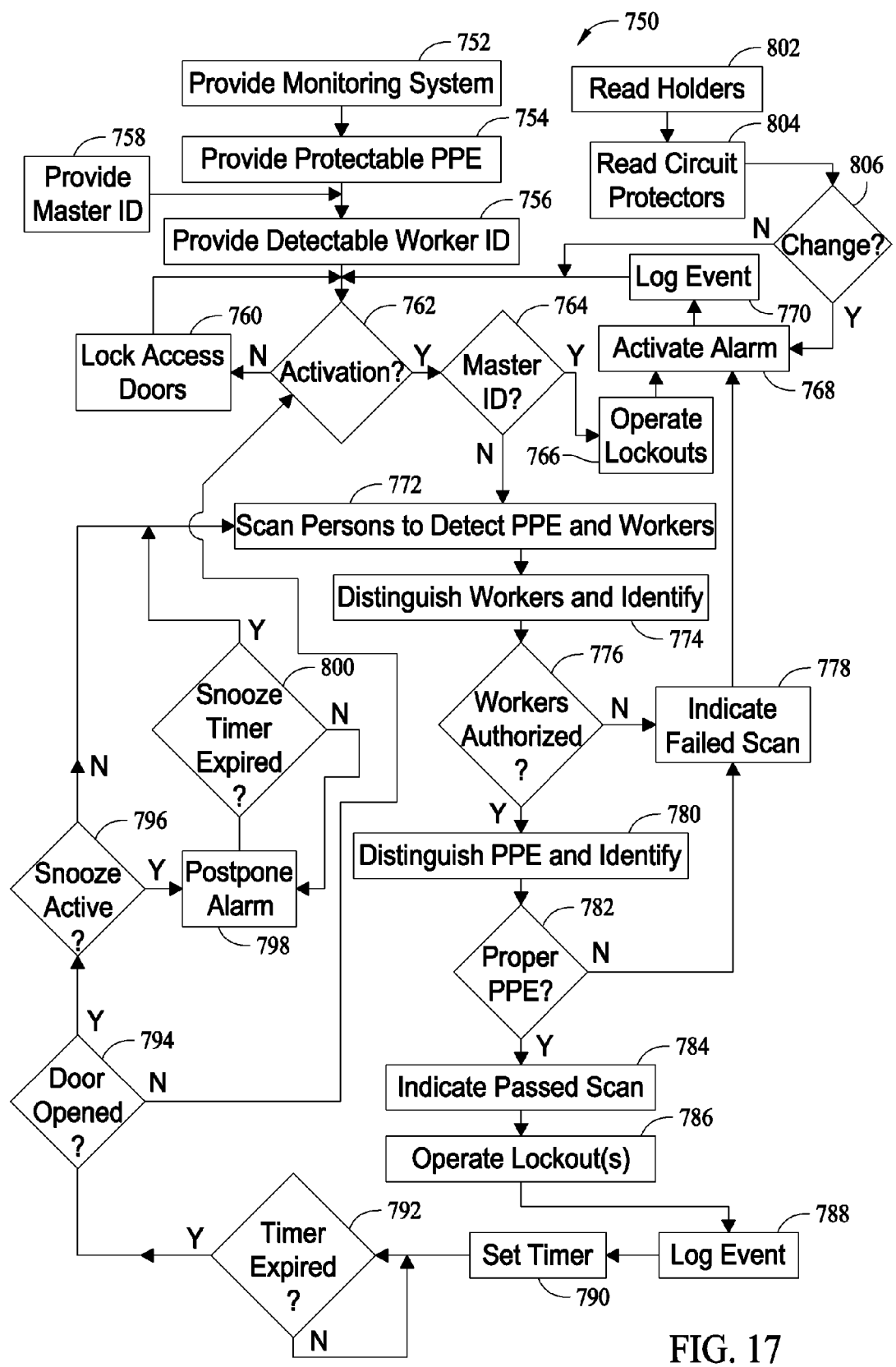
FIG. 17 is a method flowchart of processes executable by the systems shown in FIGS. 10-12.

FIG. 17 is a method flowchart of processes 750 executable by the systems 600 and 650 shown in FIGS. 10-12. Specifically, the processes may be implemented in the processor-based devices described according to executable instructions, commands and control algorithms stored in memory of the device or called from another device, as well as in response to inputs and outputs generated by workers interacting with the system or the system itself in operation.

More specifically, FIG. 17 illustrates an exemplary method of ensuring the proper use of adequate personal protective equipment in light of a potential hazard to a person, as well as other features described above. The method comprises providing 752 a monitoring system such as any of those described above, providing 754 a plurality of items of personal protective equipment each having at least one detectable characteristic such as those described above, and providing 756 a plurality of worker identification elements each having at least one detectable characteristic also describe above. As described, each of the worker identification elements provided correspond to a person, and each of the equipment identification elements provided is coupled to an item of the PPE. Additionally, the method includes providing at least one master identification element 758, which need not necessarily correspond to any particular person or be associated with any item of PPE.

Once the requisite steps 752, 754, 756 and 758 are performed, the system is ready for use. As shown at step 760 the access doors are initially locked, and the system awaits 762 for a worker to manually activate the system by manipulating the activation element of the system. If no activation has occurred, the access doors remain locked and the system returns to await activation at step 762.

If activation has occurred via manipulation of the activation element, the detector operates and looks for the master identification element at and around the location of the detector. If the system determines 764 that the master identification element has been detected, the system operates 766 the associated lockout devices to open the access doors and permit access to the energized circuitry. The system further activates 768 and alarm and logs 770 the event in system memory. For example, the date and time of the activation and the identity of the master identification element may be recorded and archived by the system for later study and analysis.

If the master identification element has not been detected at step 764, the system proceeds to scan 772 persons at the location of the potential hazard (e.g., at the electrical cabinet including the energized circuitry) with the electronic system detecting the characteristics of all items of personal protective equipment present and detecting all of the plurality of worker identification elements present. A number of workers may be scanned nearly simultaneously, and in an exemplary embodiment the detector may be configured to scan up to about 20 people at once.

The method further includes distinguishing 774 the workers from one another and identifying them (generally or specifically) using a lookup table or other information stored in memory on the system. Once the workers are identified at step 774, the system determines 776 whether they are authorized to work on the electrical circuitry, using the same or different lookup table or other information stored in system memory.

If an un-authorized worker is detected, a failed scan is indicated 778 to the worker(s), an alarm is activated 768, and the event is logged and stored 770 in system memory. For example, the date and time of the activation, and any authorized workers that were identified can be stored for further study, analysis and investigation.

If all the identified workers are found to be authorized at step 776, the system proceeds to distinguish 780 the detected PPE items from one another and identify them (generically or specifically), using a lookup table or other means. Once so identified, the system determines 782 whether the detected PPE items are appropriate for the task to be performed and are present for each of the individuals identified at step 774. If the detected PPE items are not appropriate a failed scan is indicated 778 to the worker(s), an alarm is activated 768, and the event is logged and stored 770 in system memory. For example, the date and time of the activation, and the PPE items identified or not identified can be stored for further study, analysis and investigation. The electronic system may include an indication element such as those described above, and the failed scan indication at step 778 may include providing feedback to the individuals present regarding whether the appropriate personal protective equipment was detected as present.

If both steps 776 and 782 are satisfied, both authorized workers and proper PPE items are detected. A pass scan is therefore indicated 784 to the worker(s) and the locking mechanisms are operated 786 to unlock the access doors of the electrical cabinet. The pass scan event is then logged 788 by the system, including the date, time, and all detected workers and PPE items for later study and analysis.

As shown in FIG. 17, in one embodiment the system proceeds to set 790 a timer corresponding to a predetermined interval for workers to complete a task (e.g. x number of minutes). When the timer has expired 792, the system checks 794 to see whether the access doors remain unlocked or whether the doors are opened. If the doors are found to be closed and locked, the system assumes that the maintenance procedure has been successfully completed by the workers and returns to await another activation of the system at step 762.

If the doors remain unlocked after the expiration of the time period at step 792, the system may prompt any worker that is present to activate 796 a snooze feature by, for example, manipulating the activation element again. If the snooze feature is activated within a predetermined amount of time, the system postpones 798 activation of an alarm for another predetermined period of time, which may be equal or unequal to the time period set at step 792, effectively resetting a time limit allowable by the system, and allowing workers additional time to complete their procedure. When the predetermined snooze interval is determined 800 to have expired, or if the snooze feature is not activated at step 796, the system returns to step 772 and begins to rescan all persons and equipment present to re-validate or confirm that authorized workers and PPE are present. If authorized workers and PPE items are still present, the system continues to allow access to the circuitry without signaling an alarm. If, however, unauthorized workers or inadequate PPE items are present, or no workers or PPE are detected, the system will indicate a failed scan at step 778, activate an alarm 768, log the event 770, and preferably lock the access doors. The snooze feature therefore allows some flexibility to accommodate the needs of workers, while still providing an adequate amount of security and an ability to detect opened or unlatched access doors that are otherwise unattended.

As FIG. 17 also illustrates, in some embodiments, the method also includes reading 802 the component holders (e.g., fuseholders) in the electrical cabinet, reading 804 a state of the circuit protectors, and determining 806 any changes in operating state of the circuit protectors and identity of the circuit protectors. As such, a presence or absence of the proper circuit protectors in the cabinet may be detected, as well as replacement of circuit protectors with another one. Any changes may result in activation 768 of an alarm and logging 770 of the event for later study and analysis.

The methodology described provides for real time monitoring of the proper use of personal protective gear, a degree of security and access control to potential hazards, and also information regarding circuit protector performance and installation issues. Human error associated with PPE selection, accessing the proper equipment at the electrical panel and securing the panel after work is completed, and installing fuses is largely mitigated with electronic detection techniques that quickly bring mistakes to the attention of the correct people with alarms and the like, as well as preventing some mistakes in the first instance. Real time record keeping also presents useful data and convenient recordkeeping regarding different aspects of the system that can identify training needs and identify persons posing particular risks to themselves and others.

Having now described the basic operation and methodology of the systems 600 and 650, implementation of the systems to achieve specific objectives is believed to be a matter of programming that is within the level of ordinary skill in the art.

Figure 18:
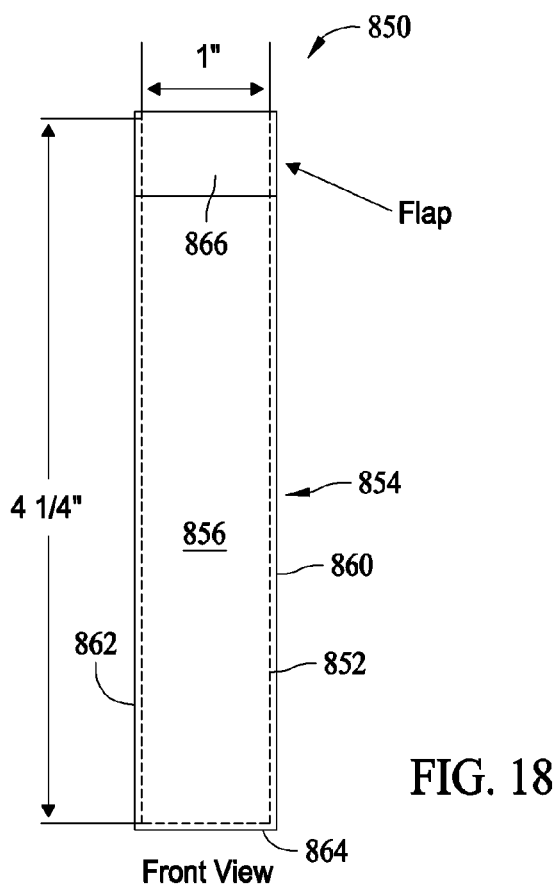
FIG. 18 is a front elevational view of a sensor tag protector according to an exemplary embodiment.
Figure 19:
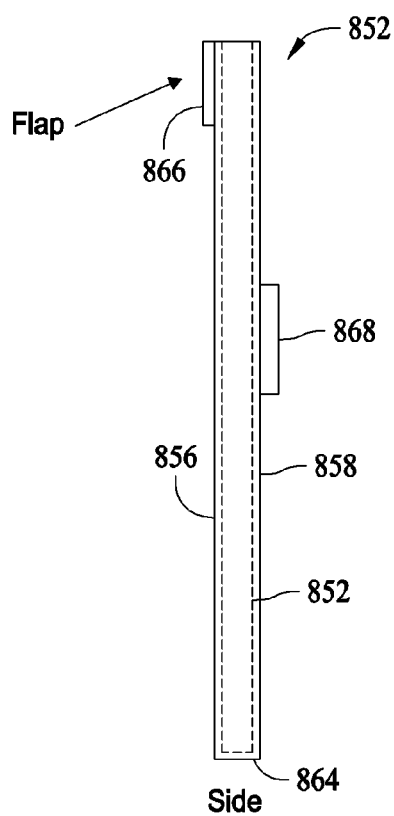
FIG. 19 is a side elevational view of the protector shown in FIG. 18.

FIGS. 18 and 19 illustrate an exemplary embodiment of a sensor tag protector 850 that may be utilized, for example, with any of the monitoring systems disclosed herein, or even with other systems for that matter. The sensor tag protector 850 provides a degree of protection to a sensor tag 852 (shown in phantom in FIGS. 18 and 19 to ensure its proper operation in ordinary use, and also provides a degree of protection to a person possessing the tag 852. It is possible, for example, that in the event of an arc flash event occurring while energized electrical circuitry is being serviced, conductive portions of the sensor tag 852 may overheat and fail, presenting a secondary hazard to a person possessing it.

As shown in FIGS. 18 and 19, in one embodiment the sensor tag protector 850 is provided in the form of a generally rectangular body 854 having front and rear sidewalls or panels 856 and 858, side walls or panels 860 and 862 interconnecting the front and real walls 860 and 862, an end wall or panel 864, and a fold over flap 864. The walls 858, 856, 860, 862, 864 and the flap 864 may be fabricated from various materials known in the art, but in an exemplary embodiment are fabricated from fireproof materials. Like the personal protective equipment described above, different grades or degrees of fireproof materials appropriately be provided for use in different situations involving different arc flash intensity risks. Graphics, colors, indicia or other identifying elements may be provided so that the protectors may be distinguished from one another and/or appropriately matched with personal protective equipment of the same grade. A coupling element 868, such as a hook and loop fastener, may be provided, for example, to removably attach the sensor tag protector 850 to an item of personal protective equipment, a clothing item, or other object.

The body 854 defines a protective enclosure generally surrounding the sensor tag 852 when the sensor tag 852 is inserted therein, which for example, may be any of the identification elements or other sensor tags described above. The sensor tag 852 may conveniently be inserted in the protector 850 and later removed or replaced with another sensor tag 852. By enclosing and surrounding the inserted sensor tag 852 with fireproof material, for example, the sensor tag 852 may be prevented from overheating in an arc flash incident in the first place, and if overheating of the tag 852 were to occur, potentially hazardous conditions are generally contained in the body 854 of the protector 850. Also, enclosing and surrounding the sensor tag 852 prevents the sensor tag 852 from being inadvertently nicked, scratched, marred, or otherwise damaged in ordinary use and handling by a person. It is contemplated that the body may accommodate more than one sensor tag, or otherwise be provided with pockets and the like for other items.

While entirely enclosing the sensor tag 852 is believed to be desirable, it is contemplated that in other embodiments a partial enclosure of the sensor tag may provide sufficient protection of the tag 852. For example, the fold over flap 866 may be omitted in another embodiment and/or the walls or panels of the protector body 854 may not completely cover the entire sensor tag 852. It is preferable, however, that at least the areas of the conductive portions of the sensor tag 852 are covered and externally shielded by the protector body 854.

Many adaptations of the protector 850 as illustrated are possible. For example, in another embodiment the side walls 860, 862 and the end wall 864 may be omitted in favor of the front and wear walls 856 and 858 being stitched, adhered, or otherwise joined together. In such a manner, a protective enclosure for the sensor tag 852 may be provided with a reduced amount of material. One or more of the walls or panels in the body 854 may be layered from the same or different materials, or different walls or panels of the protector body 850 could be fabricated from different materials, some of which may be fireproof and others not. That is, fireproof and non-fireproof combinations may be used in combination in certain embodiments. Preferably, however, at least the rear wall or panel 858 would be fabricated from a fireproof material to provide a fireproof barrier between the sensor tag 852 and non-fireproof materials to which it may be attached, including but not limited to clothing items. One or more of the walls or panels in the body 854 may be transparent to reveal the presence of the tag or to provide visual inspection thereof without removing the sensor tag 852 from the body 854.

As those in the art will no doubt appreciate, various types of protective pockets or pouches may alternatively be provided as alternatives to the example shown in FIGS. 18 and 19 to provide similar protection to the sensor tags, including RFID elements as described above or other sensor tags. As one example, the sensor tag 852 may be encapsulated, dipped in or otherwise coated with a protective material such that the sensor tag 852 may not be removed from the protector body. The sensor tag protectors may further be integrated into other objects or items, such as worker identification badges or security badges, tool belts, tools, etc.

Various coupling elements 868 may also be provided in lieu of or in addition to the hook and look-type fastener 868. That is, for example, various types of clips, pins, snaps, buttons, tapes, and even adhesives may be provided. Magnetic couplers may be likewise be used in some embodiments, provided that they do not unduly interfere with operation of the sensor tag. Button holes may be provided in one or more of the walls or panels of the protector body 854 and used to attach the body 854 to a button on a shirt or jacket, for example.

It is also contemplated that the sensor tag protector 854 could be permanently attached to clothing items or items of personal protective equipment as desired. That is the pockets could be stitched, sewn, or incorporated into clothing items or items of personal protective equipment at interior or exterior locations.

V. CONCLUSION

Multiple embodiments of the inventive systems and methods for ensuring the proper use of personal protective equipment for potentially hazardous working environments have now been explained and the benefits of the invention are believed to be amply demonstrated.

While the invention has been described in terms of various specific embodiments, those skilled in the art will recognize that the invention can be practiced with modification within the spirit and scope of the claims.

What is claimed is:

1. A monitoring system for ensuring a proper use of a plurality of different items of personal protective equipment for potential hazards presented to a plurality of persons while servicing energized electrical circuitry, the system comprising:
    an equipment identification element coupled to at least one of the plurality of items of personal protective equipment to be used by the plurality of persons, each of the plurality of items of personal protective equipment adapted to provide one of a plurality of predetermined levels of protection to each of the plurality of persons in the event of an arc flash incident occurring while the energized electrical circuitry is being serviced, each respective predetermined level of protection corresponding to different arc flash incident risks posed by the energized electrical circuitry in different portions of an electrical power system;
    a detector located proximate a portion of the energized electrical circuitry to be serviced and configured to detect the equipment identification element when the at least one of the plurality of items of the personal protective equipment item is by each of the plurality of persons within a predetermined spatial distance of the portion of energized electrical circuitry;
    a lockout device allowing or denying access to the potential hazards of the energized electrical circuitry;
    a processor-based device configured to:
        determine, based upon a detected characteristic of each of the equipment identification elements presented by the plurality of persons, a respective one of the predetermined levels of protection corresponding to the equipment identification element;
        verify, based on a specific potential arc flash energy intensity of the electrical circuitry to be serviced at the location of the detector, whether the predetermined level of protection associated with the equipment identification element presented is qualitatively appropriate to provide an adequate level of protection to each of the plurality of persons when servicing the electrical circuitry;
        operate the lockout device and provide access to the energized electrical circuitry by the plurality of persons when the items of personal protective equipment corresponding to all of the plurality of persons has been verified as qualitatively appropriate; and
        operate the lockout device to deny access to the energized electrical circuitry by the plurality of persons if any one of the items of personal protective equipment corresponding to any of the plurality of persons has not been verified as qualitatively appropriate.

2. The system of claim 1, further comprising an activation element, the detector configured to communicate with the equipment identification element only after the activation element is manipulated by one of the plurality of persons.

3. The system of claim 2, wherein the activation element is selected from the group consisting of a pushbutton, a lever, a toggle switch, a keypad, and a magnetic card reader.

4. The system of claim 2, wherein the activation element is mounted to an electrical cabinet containing the portion of the energized electrical circuitry to be serviced.

5. The system of claim 2, wherein the processor-based device is configured to log occurrences wherein the activation element is manipulated and at least one of the predetermined levels of protection for at least one of the items of personal protective equipment is not verified as appropriate.

6. The system of claim 1, wherein the detector is mounted to an electrical cabinet containing the portion of the energized electrical circuitry to be serviced.

7. The system of claim 1, wherein the energized electrical circuitry is contained in an electrical cabinet, the cabinet having a plurality of access doors each respectively exposing a sub-portion of the portion of the electrical circuitry to be serviced when opened.

8. The system of claim 7, wherein each of the plurality of access doors is lockable and unlockable by the processor-based device.

9. The system of claim 1, further comprising an indication device located proximate the portion of energized electrical circuitry to be serviced, the indication device identifying whether the predetermined level of protection associated with the equipment identification element for all of the plurality of persons has been verified to be appropriate.

10. The system of claim 9, wherein the indication device comprises lights displayed in one of at least two colors.

11. The system of claim 10, wherein the lights include light emitting diodes of different colors.

12. The system of claim 9, wherein the indication device includes a representation of a human person and associated items of personal protective gear for different portions of the person's body, and the indication element identifies, via the representation of the human person, which of the associated items of personal protective gear have been detected and verified.

13. The system of claim 1, further comprising a worker identification element uniquely identifying each of the plurality of persons associated with the personal protective equipment, and the processor-based device adapted to determine whether each of the plurality of persons is authorized to service the energized electrical circuitry based upon a detected characteristic of the respective worker identification element associated with each of the plurality of persons.

14. The system of claim 12, wherein the processor-based device is further configured to:

operate the lockout device and provide access to the energized electrical circuitry by the plurality of persons when all of the plurality of persons are authorized; and operate the lockout device to deny access to the energized electrical circuitry by the plurality of persons when at least one of the plurality of persons is not authorized.

15. The system of claim 13, further comprising an indication device located proximate the energized electrical circuitry, the indication device providing confirmation regarding a number of persons that have been detected.

16. The system of claim 15, the indication device providing confirmation whether detected person are authorized.

17. The system of claim 16, wherein the indication device comprises at least one light indicating whether the predetermined level of protection associated with the equipment identification element presented is qualitatively appropriate.

18. The system of claim 13, further comprising at least one master identification element, and when the master identification element is detected by the detector, the lockout device is operated without verifying whether the predetermined level of protection associated with the equipment identification elements presented is qualitatively appropriate.

19. The system of claim 1, wherein the processor-based device is configured to transmit data corresponding to detected items of personal protective equipment to a remote location.

20. The system of claim 19, wherein the processor-based device is configured to wirelessly transmit data corresponding to detected items of personal protective equipment to a remote location.

21. The system of claim 1, wherein the detector is one of an RFID reader or interrogator, a bar code scanner, and an x-ray scanner.

22. The system of claim 2, wherein the processor-based device is configured to, after an expiration of a predetermined time interval beginning when the activation element is manipulated, cause the detector to operate to confirm the presence or absence of items of equipment identification element proximate the portion of the energized electrical circuitry.

23. The system of claim 22, wherein if detected items of personal protective equipment are verified as appropriate, the processor-based device resets the predetermined time interval, and at the expiration therefore, causes the detector to operate to confirm the presence or absence of the detected items of personal protective equipment.

24. The system of claim 1, wherein the energized electrical circuitry is contained an electrical cabinet including at least one door, the system further comprising at least one door latch sensor detecting a latched or unlatched state of the door.

25. The system of claim 24, further comprising an alarm element indicating the latched or unlatched state of the door.

26. The system of claim 24, wherein the processor-based device is adapted to log occurrences of the door in an unlatched state.

27. The system of claim 1, wherein the electrical circuitry includes one or more circuit protectors provided with a sensor element, the detector detecting an operating state of the one or more circuit protectors in addition to detecting the identification elements of the personal protective equipment.

28. The system of claim 27, wherein the one or more circuit protectors includes a fuse.

29. The system of claim 1, wherein the personal protective equipment corresponding to each of the predetermined levels of protection comprises one or more of a hard hat, a face shield, a flame resistant neck protector, an ear protector, a protective suit, an insulated rubber glove, an insulated piece of footwear, and an insulated tool.

30. The system of claim 1, further comprising at least one state indicator element for an electrical component, the detector configured to communicate with the state indicator.

31. The system of claim 1, wherein the electrical circuitry includes at least one circuit protector, the circuit protector received in a holder, the holder provided with a holder identification element, and the detector communicating with the holder identification element.

32. The system of claim 1, further comprising a management system remotely located from the processor-based device, and another detector remotely located from the circuitry and configured to communicate with the equipment identification element for initialization purposes.

33. The system of claim 1, further comprising a sensor tag protector.

34. The system of claim 1, wherein the energized electrical circuitry is contained in an electrical cabinet, the cabinet having at least one access door exposing a sub-portion of the portion of the electrical circuitry to be serviced when opened, and wherein the processor based device is configured to determine a state of the door as opened or closed; and wherein the processor based device is configured to account for the state of the door when verifying whether the predetermined level of protection is appropriate.

35. The system of claim 1, further comprising an activation element, wherein the processor based device is configured to determine a manipulation of the activation element; and wherein the processor based device is configured to account for whether or not the activation element has been manipulated when verifying whether the predetermined level of protection is appropriate.

36. The system of claim 1, wherein the processor based device is further configured to, if the predetermined level of protection associated with the equipment identification element presented is not verified as appropriate, identify the same to a user.

* * * * *